United States Patent
Yamamoto

(10) Patent No.: US 7,509,045 B2
(45) Date of Patent: Mar. 24, 2009

(54) INFORMATION PROCESSING APPARATUS, INFORMATION PROCESSING METHOD, AND PROGRAM

(75) Inventor: Mihoko Yamamoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 453 days.

(21) Appl. No.: 11/219,819

(22) Filed: Sep. 7, 2005

(65) Prior Publication Data

US 2006/0051083 A1 Mar. 9, 2006

(30) Foreign Application Priority Data

Sep. 8, 2004 (JP) ............................ P2004-261441

(51) Int. Cl.
*G03B 17/18* (2006.01)
(52) U.S. Cl. .................. 396/287; 396/301; 348/14.02
(58) Field of Classification Search ................. 396/287, 396/301; 348/14.02, 333.06
See application file for complete search history.

(56) References Cited

U.S. PATENT DOCUMENTS

| | | | |
|---|---|---|---|
| 2003/0119560 A1* | 6/2003 | Takatori et al. ............. | 455/564 |
| 2003/0153372 A1* | 8/2003 | Shimamura et al. ......... | 455/575 |
| 2004/0004667 A1 | 1/2004 | Morikawa et al. | |
| 2004/0203527 A1* | 10/2004 | Matsumoto ................ | 455/90.3 |
| 2004/0259609 A1* | 12/2004 | Fujii et al. ............... | 455/575.3 |
| 2004/0266477 A1* | 12/2004 | Murata .................... | 455/556.1 |
| 2005/0064919 A1* | 3/2005 | An et al. .................. | 455/575.3 |
| 2005/0212983 A1* | 9/2005 | Kawamoto .................. | 348/838 |
| 2005/0250531 A1* | 11/2005 | Takebe et al. ............. | 455/550.1 |
| 2005/0264460 A1* | 12/2005 | Sunaga ..................... | 343/702 |
| 2006/0104628 A1* | 5/2006 | Hasegawa et al. ........... | 396/287 |
| 2006/0160577 A1* | 7/2006 | Cheng et al. ............... | 455/566 |
| 2006/0215044 A1* | 9/2006 | Masuda et al. ............. | 348/224.1 |
| 2006/0240866 A1* | 10/2006 | Eilts ....................... | 455/566.1 |
| 2007/0032276 A1* | 2/2007 | Sawayama et al. ........ | 455/575.3 |

FOREIGN PATENT DOCUMENTS

| | | |
|---|---|---|
| JP | 08-275097 | 10/1996 |
| JP | 8-275097 | 10/1996 |
| JP | 2000-092360 | 3/2000 |

* cited by examiner

*Primary Examiner*—W. B. Perkey
*Assistant Examiner*—Warren K Fenwick
(74) *Attorney, Agent, or Firm*—Finnegan, Henderson, Farabow, Garrett & Dunner, L.L.P.

(57) ABSTRACT

Disclosed is an information processing apparatus, wherein an operation mode at power-on is set to an optimal operation mode for a user in accordance with a state of a display panel unit. According to an embodiment of the present invention, an information processing apparatus in which a display unit can open/close and rotate with respect to a body unit includes a detector detecting at least one of an opening/closing state and a rotating state of the display unit; and a mode setting unit setting an operation mode of the information processing apparatus at power-on in accordance with a state of the display unit detected by the detector.

17 Claims, 13 Drawing Sheets

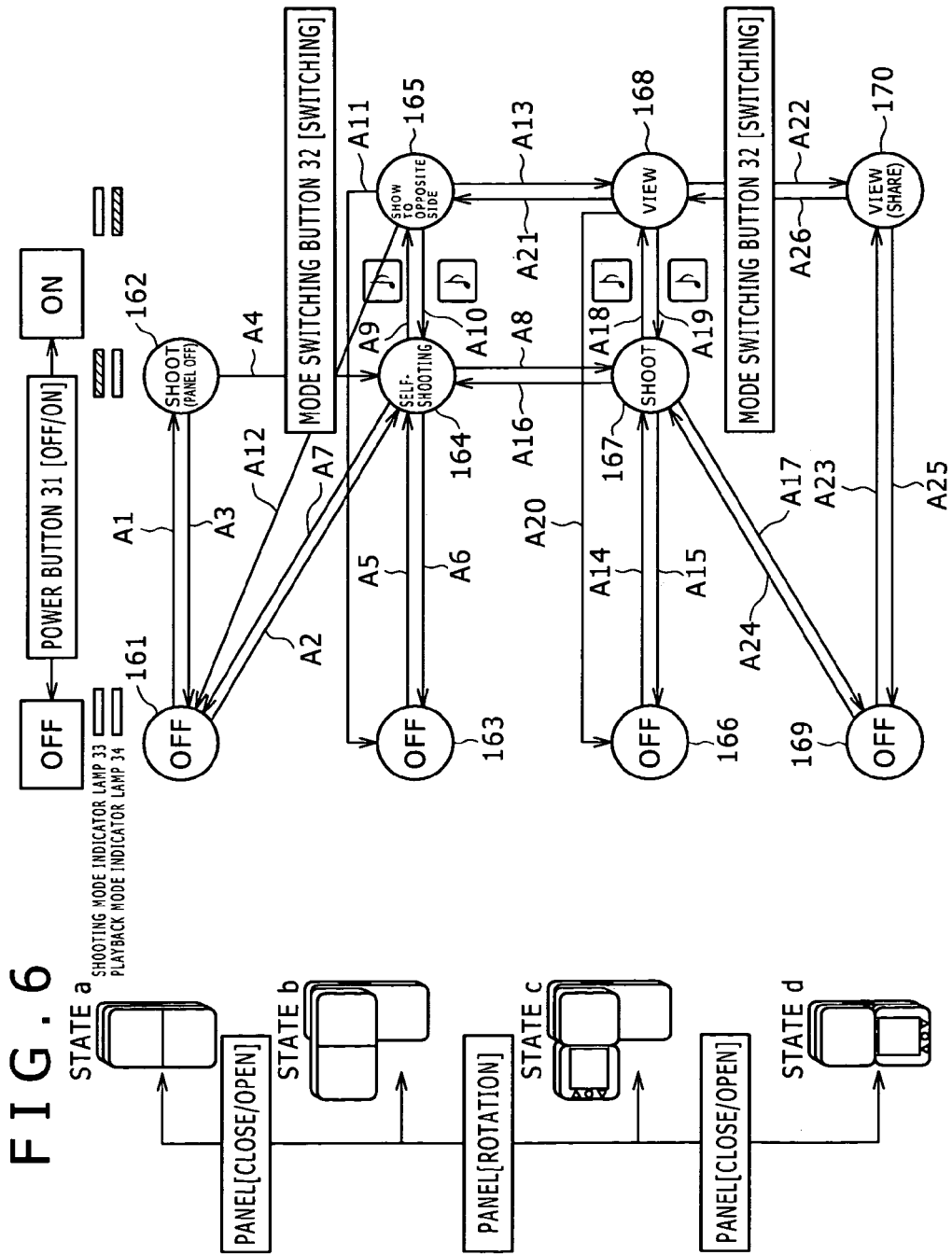

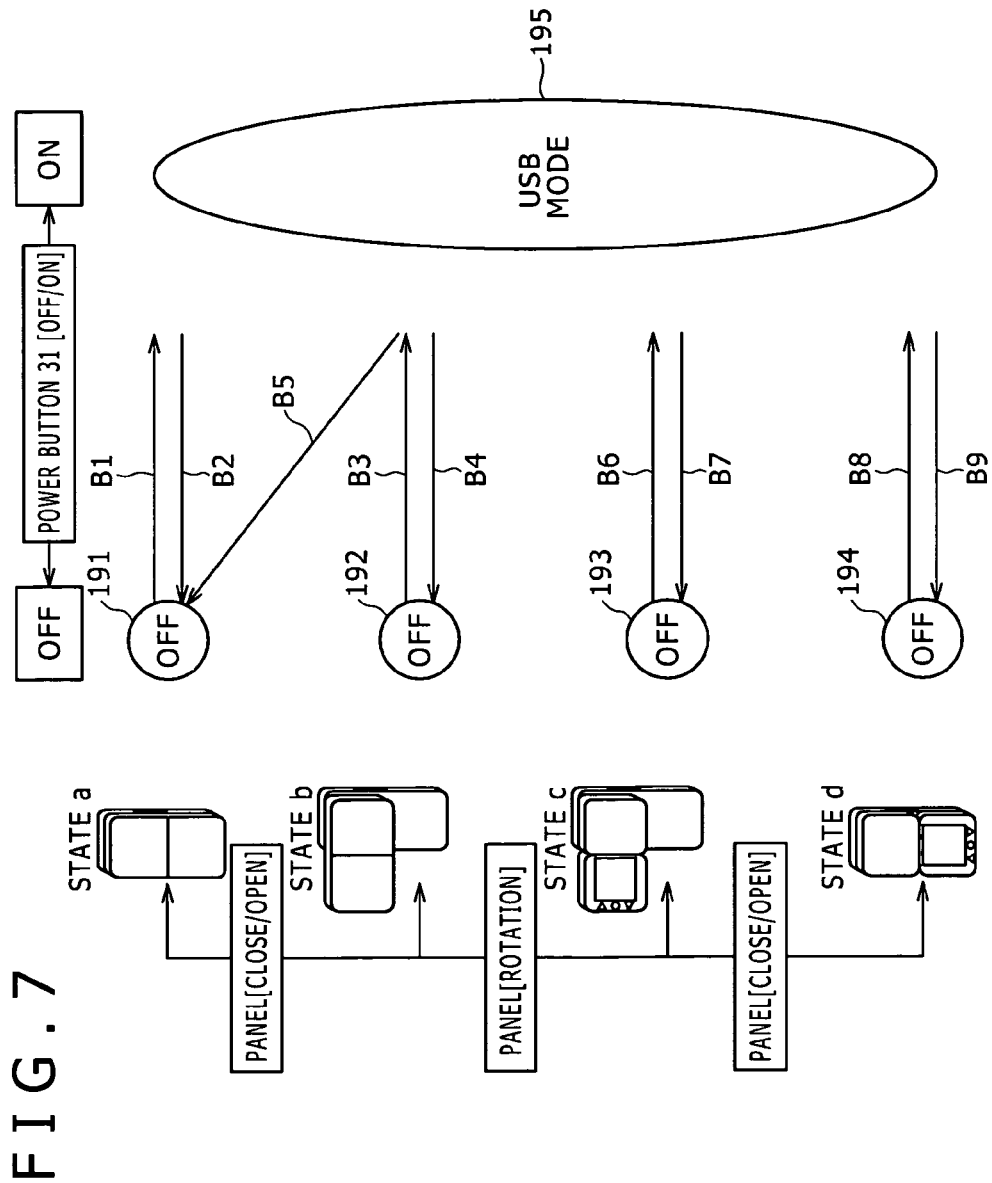

FIG. 8

ON: NORMAL ON
ON(PS): POWER SAVING (DISPLAY PANEL IS OFF)

| USER OPERATION | | BEFORE TRANSITION ON/OFF | AFTER TRANSITION MODE | ON/OFF | MODE | TRANSITION |
|---|---|---|---|---|---|---|
| PANEL OPEN/CLOSE | C1 a→b | OFF | | ON | SHOOTING MODE | A2 |
| | | ON(PS) | SHOOTING MODE | ON | SHOOTING MODE | A4 |
| | | ON | USB MODE | ON | USB MODE | NO TRANSITION |
| | C2 b→a | OFF | | OFF | | NO TRANSITION |
| | | ON | SHOOTING MODE | OFF | | A7 |
| | | ON | PLAYBACK MODE | OFF | | A12 |
| | | ON | USB MODE | OFF | | B5 |
| PANEL ROTATION | C3 b→c | OFF | | OFF | | NO TRANSITION |
| | | ON | SHOOTING MODE | ON | SHOOTING MODE | A8 |
| | | ON | PLAYBACK MODE | ON | PLAYBACK MODE | A13 |
| | | ON | USB MODE | ON | USB MODE | NO TRANSITION |
| | C4 c→b | OFF | | OFF | | NO TRANSITION |
| | | ON | SHOOTING MODE | ON | SHOOTING MODE | A16 |
| | | ON | PLAYBACK MODE | ON | PLAYBACK MODE | A21 |
| | | ON | USB MODE | ON | USB MODE | NO TRANSITION |
| PANEL OPEN/CLOSE | C5 d→c | OFF | | ON | SHOOTING MODE | A24 |
| | | ON | PLAYBACK MODE | ON | PLAYBACK MODE | A26 |
| | | ON | USB MODE | ON | USB MODE | NO TRANSITION |
| | C6 c→d | OFF | | OFF | | NO TRANSITION |
| | | ON | PLAYBACK MODE | ON | PLAYBACK MODE | A17 |
| | | ON | USB MODE | ON | USB MODE | A22 |

FIG. 9

ON: NORMAL ON
ON(PS): POWER SAVING
(DISPLAY PANEL IS OFF)

| USER OPERATION | | BEFORE TRANSITION | | AFTER TRANSITION | | TRANSITION |
|---|---|---|---|---|---|---|
| | STATE | ON/OFF | MODE | ON/OFF | MODE | |
| DEPRESS POWER BUTTON | STATE a | OFF | | ON | SHOOTING MODE | A1 |
| | | ON(PS) | don't care | OFF | | A3 |
| | STATE b | OFF | | ON | SHOOTING MODE | A5 |
| | | ON | don't care | OFF | | A6, A11 |
| | STATE c | OFF | | ON | SHOOTING MODE | A14 |
| | | ON | don't care | OFF | | A15, A20 |
| | STATE d | OFF | | ON | PLAYBACK MODE | A23 |
| | | ON | don't care | OFF | | A25 |
| DEPRESS MODE SWITCHING BUTTON | STATE a | ON(PS) | SHOOTING MODE | OFF | | ERROR |
| | | ON(PS) | USB MODE | ON(PS) | USB MODE | NO TRANSITION |
| | STATE b | ON | SHOOTING MODE | ON | PLAYBACK MODE | A9 |
| | | ON | PLAYBACK MODE | ON | SHOOTING MODE | A10 |
| | | ON | USB MODE | ON | USB MODE | NO TRANSITION |
| | STATE c | ON | SHOOTING MODE | ON | PLAYBACK MODE | A18 |
| | | ON | PLAYBACK MODE | ON | SHOOTING MODE | A19 |
| | | ON | USB MODE | ON | SHOOTING MODE | NO TRANSITION |
| | STATE d | ON | PLAYBACK MODE | OFF | | ERROR |
| | | ON | USB MODE | ON | USB MODE | NO TRANSITION |

INFORMATION PROCESSING APPARATUS, INFORMATION PROCESSING METHOD, AND PROGRAM

CROSS REFERENCES TO RELATED APPLICATIONS

The present invention contains subject matter related to Japanese Patent Application JP 2004-261441 filed in the Japanese Patent Office on Sep. 8, 2004, the entire contents of which being incorporated herein by reference.

FIELD OF THE INVENTION

The present invention relates to an information processing apparatus, an information processing method, and a program. In particular, the present invention concerns an information processing apparatus, an information processing method, and a program by which in accordance with a state of a display panel unit, an operation mode at power-on can be set to an optimal operation mode for a user.

BACKGROUND OF THE INVENTION

There is a combination camera and videocassette recorder that has a display panel openable and closable to a body and controls display on the display panel in accordance with an opening/closing or rotating state of the display panel (e.g., see Japanese Patent Application Laid-Open No. 8-275097).

More specifically, in the case where the user can view the display panel, display is made on the display panel. In the case where the user cannot view the display panel, display is not made on the display panel. This negates the need for the user to enable or disable display on the display panel in accordance with a state of the display panel, thereby making it possible to improve the usability.

In the combination camera and videocassette recorder described in patent document 1, for example, the user selects a desired operation mode from among operation modes such as a shooting mode (recording mode) in which the user shoots a subject and records the obtained image, a playback mode in which the user displays an image played back (hereinafter referred to as a playback image) from a specified recording medium on the display panel, and the like. Further, in the case where the combination camera and videocassette recorder is turned on for example, the operation mode is the one that the user has selected, irrespective of a state of the display panel.

Consequently, in the case where user's desired operation modes vary with states of the display panel, when the user changes the opening/closing or rotating state of the display panel and then turns the power on, the user unpreferably has to select a new desired operation mode in the present state of the display panel. That is, in the case where the user does not select a new operation mode, the operation mode that the user has selected is optimal for the user before changing the state of the display panel, but not optimal for the user after changing the state of the display panel. Accordingly, the user needs to select a new optimal operation mode after changing the state of the display panel.

According to an embodiment of the present invention, an operation mode at power-on can be set to an optimal operation mode for a user in accordance with a state of a display panel unit.

SUMMARY OF THE INVENTION

An information processing apparatus according to an embodiment of the invention includes a detector detecting at least one of an opening/closing state and a rotating state of a display unit; and a mode setting unit setting an operation mode of the information processing apparatus at power-on in accordance with a state of the display unit detected by the detector.

In the case where the display unit is rotated such that a display surface of the display unit faces outward and is closed with respect to a body unit, the mode setting unit can set the operation mode of at power-on to a playback mode in which a playback image played back from a specified recording medium is displayed on the display unit.

Based on a set value representing an operation mode that is set in accordance with each state of the display unit by a user, in accordance with a state of the display unit, the mode setting unit can set the operation mode of at power-on to an operation mode represented by a set value corresponding to the state of the display unit.

The information processing apparatus can further include a power supply controller controls power-on or power-off in the case where the display unit is closed with respect to the body unit in accordance with a state of the display unit detected by the detector and an operation mode of the information processing apparatus.

In the case where the power is on and the display unit is rotated such that a display surface of the display unit faces outward, and a state of opening the display unit with respect to the body unit has changed to a state of closing the display unit, the power supply controller can perform control for keeping the power on if the operation mode is a playback mode in which a playback image played back from a specified recording medium is displayed on the display unit or for turning the power off if the operation mode is a shooting mode.

Based on a set value representing power-on or power-off that is set in accordance with each state and each operation mode of the display unit by a user, in accordance with a state and an operation mode of the display unit, the power supply controller can control power-on or power-off represented by a set value corresponding to the state and the operation mode of the display unit in the case where the display unit is closed with respect to the body.

The information processing apparatus can further include an acceptance unit accepting an operation by a user; and a processor performing processing corresponding to an operation accepted by the acceptance unit, wherein the processor can change the processing corresponding to the operation, in accordance with the operation mode.

Based on a set value representing processing corresponding to the operation that is set in accordance with each operation mode by a user, in accordance with the operation mode, the processor can change the processing corresponding to the operation to processing corresponding to an operation represented by a set value corresponding to the operation mode.

An information processing method according to another embodiment of the invention includes the steps of detecting at least one of an opening/closing state and a rotating state of the display unit; and setting an operation mode of the information processing apparatus at power-on in accordance with a state of the display unit detected by the detector.

A program according to still another embodiment of the invention includes the steps of detecting at least one of an opening/closing state and a rotating state of the display unit; and setting an operation mode of the information processing apparatus at power-on in accordance with a state of the display unit detected by the detector.

According to an embodiment of the invention, at least one of an opening/closing state and a rotating state of a display unit is detected and an operation mode of the information processing apparatus at power-on is set in accordance with a state of the display unit.

According to an embodiment of the present invention, an operation mode at power-on can be set to an optimal operation mode for a user in accordance with a state of a display panel unit.

BRIEF DESCRIPTION OF THE DRAWINGS

Embodiments of the present invention will be described in detail based on the following figures, wherein:

FIG. 6 is an illustration explaining transitions of the operation modes of the digital camera;

FIG. 7 is an illustration explaining transitions of the operation modes of the digital camera;

FIG. 8 is an illustration explaining transitions of the operation modes of the digital camera;

FIG. 9 is an illustration explaining transitions of the operation modes of the digital camera;

DETAILED DESCRIPTION OF THE PREFERRED EMBODIMENTS

Figure 1:
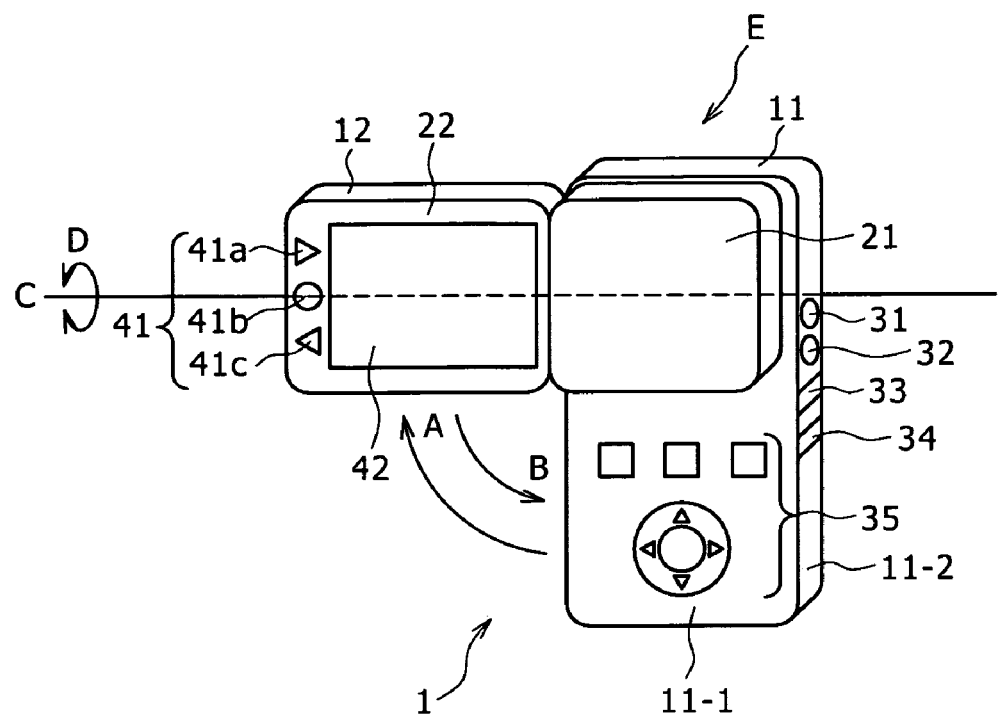
FIG. 1 is a perspective view exemplifying the external structure of a digital camera to which the present invention is applied.

Before the embodiments of the present invention are described below, a description will be made below to exemplify corresponding relationships between constituent features described in the claims and specific examples in the embodiments. This description is to verify that the specific examples which support the invention described in the claims are described in the embodiments of the invention. Therefore, even if there is a specific example that is described in the embodiments of the invention but not described in this description as a specific example corresponding to a constituent feature, it does not mean that the specific example does not correspond to the constituent feature. On the other hand, even if there is a specific example that is described in this description as a specific example corresponding to a constituent feature, it does not mean that the specific example does not correspond to other constituent features than the constituent feature.

Further, this description does not mean that the invention corresponding to the specific examples described in the embodiments is all described in the claims. In other words, this description does not deny existence of an invention that corresponds to the specific examples described in the embodiments and is not described in the claims in this application, that is, existence of an invention that is added by a divisional application or an amendment in the future.

An information processing apparatus (e.g., a digital camera 1 in FIG. 1) according to claim 1 in which a display unit (e.g., a display panel unit 22 in FIG. 1) can open/close and rotate with respect to a body unit (e.g., a body unit 11 in FIG. 1), includes a detector (e.g., a state detector 105 in FIG. 4) detecting at least one of an opening/closing state and a rotating state of the display unit; and a mode setting unit (e.g., a mode setting unit 142 in FIG. 5) setting an operation mode of the information processing apparatus at power-on in accordance with a state of the display unit detected by the detector.

In an information processing apparatus according to claim 2, in the case where the display unit is rotated such that a display surface (e.g., a display panel 42 in FIG. 1) of the display unit faces outward and is closed with respect to the body unit (e.g., state d), the mode setting unit sets the operation mode of at power-on to a playback mode (e.g., step S34 in FIG. 11) in which a playback image played back from a specified recording medium (e.g., a storage unit 107, a memory card 112 or the like in FIG. 4) is displayed on the display unit.

An information processing apparatus according to claim 4, further includes a power supply controller (e.g., a power supply controller 141 in FIG. 5) which controls power-on or power-off in the case where the display unit is closed with respect to the body unit in accordance with a state of the display unit detected by the detector and an operation mode of the information processing apparatus.

In an information processing apparatus according to claim 5, in the case where the power is on and the display unit is rotated such that a display surface of the display unit faces outward, and a state (e.g., state c) of opening the display unit with respect to the body unit has changed to a state (e.g., state d) of closing the display unit, the power supply controller performs control for keeping the power on (e.g., transition A22 in FIG. 6, NO at step S19 in FIG. 10) if the operation mode is a playback mode in which a playback image played back from a specified recording medium is displayed on the display unit or for turning the power off (e.g., transition A17 in FIG. 6, step S16 in FIG. 10) if the operation mode is a shooting mode.

An information processing apparatus according to claim 7, further includes an acceptance unit (e.g., an external operation input unit 106 in FIG. 4) accepting an operation by a user; and a processor (e.g., an operation processor 143 in FIG. 5) performing processing corresponding to an operation accepted by the acceptance unit, wherein the processor changes the processing corresponding to the operation, in accordance with the operation mode.

Figure 10:
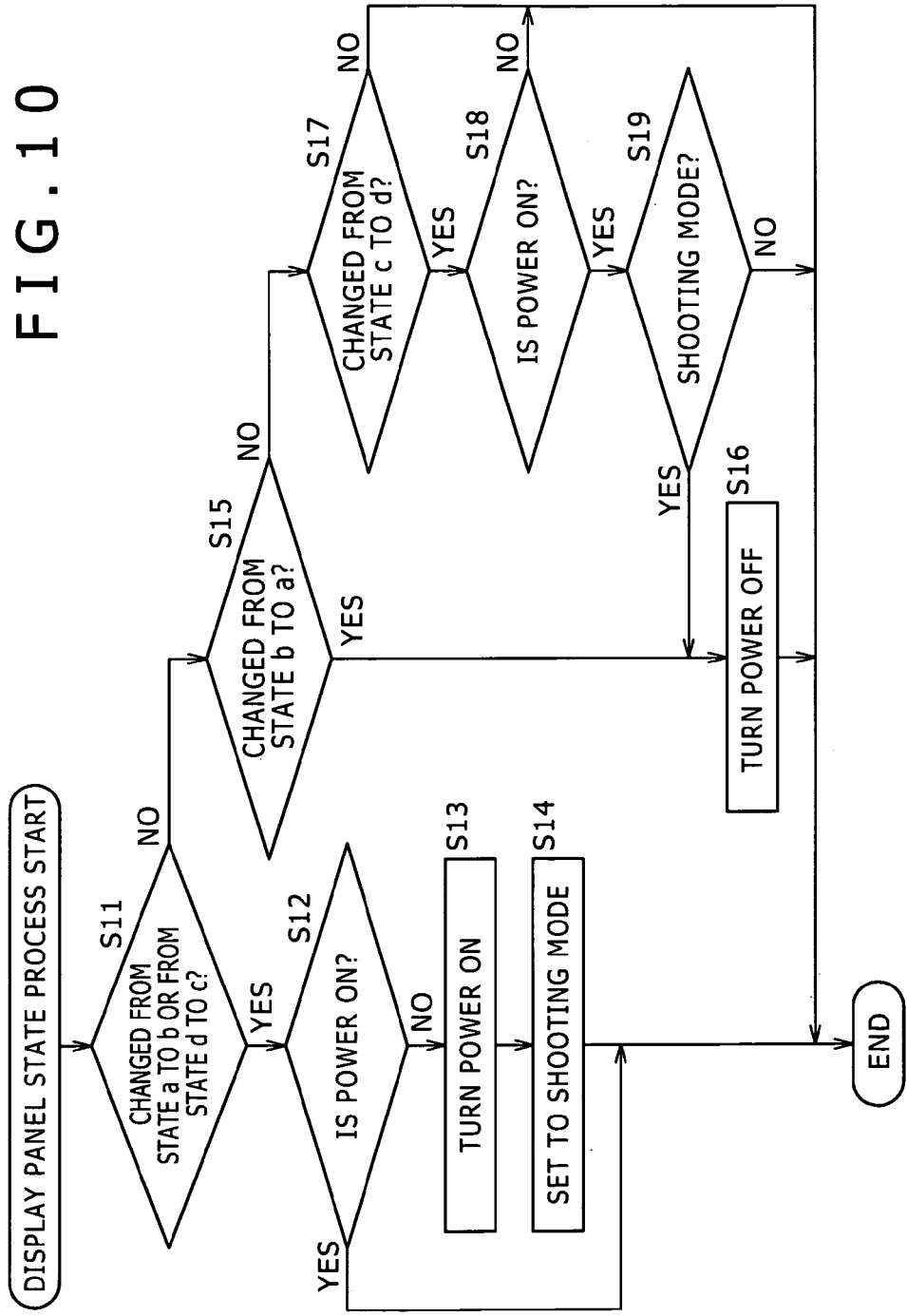
FIG. 10 is a flowchart explaining a display panel state process in which the digital camera sets an operation mode in accordance with a state a, b, c or d of a display panel unit.

An information processing method according to claim 9 of an information processing apparatus (e.g., a digital camera 1 in FIG. 1) in which a display unit (e.g., a display panel unit 22 in FIG. 1) can open/close and rotate with respect to a body unit (e.g., a body unit 11 in FIG. 1), includes the steps of detecting at least one of an opening/closing state and a rotating state of the display unit (e.g., step S11 in FIG. 10); and setting an operation mode of the information processing apparatus at power-on in accordance with a state of the display unit detected by the detector (e.g., step S14 in FIG. 10).

A program according to claim 10 executed by an information processing apparatus (e.g., a digital camera 1 in FIG. 1) in which a display unit (e.g., a display panel unit 22 in FIG. 1) can open/close and rotate with respect to a body unit (e.g., a body unit 11 in FIG. 1), includes the steps of detecting at least one of an opening/closing state and a rotating state of the display unit (e.g., step S11 in FIG. 10); and setting an operation mode of the information processing apparatus at power-on in accordance with a state of the display unit detected by the detector (e.g., step S14 in FIG. 10).

Hereinafter, a detailed description will be made of a specific embodiment to which the present invention is applied, with reference to the accompanying drawings.

FIG. 1 is a perspective view exemplifying the external structure of a digital camera to which the present invention is applied.

A digital camera 1 is composed of a body unit 11 and a display unit 12. The display unit 12 is further composed of an attachment unit 21 and a display panel unit 22.

The attachment unit 21 of the display unit 12 is attached on the upper part of a surface 11-1 of the body unit 11 in FIG. 1. The display unit 12 is supported on the body part such that it can open/close (rotate) in the direction of arrow A or B with respect to the body unit 11.

Further, the display panel unit 22 of the display unit 12 is supported such that it can rotate in the direction of arrow D, with respect to the attachment unit 21. That is, the display panel unit 22 is supported such that it can rotate about axis C in the direction of arrow D, thereby enabling a user to freely position the display panel unit 22 with respect to the body unit 11.

There are provided a power button 31, a mode switching button 32, a shooting mode indicator lamp 33, and a playback mode indicator lamp 34 on a surface 11-2 of the body unit 11.

The power button 31 is operated at the time of turning the power on or off. The mode switching button 32 is operated at the time of changing an operation mode (the shooting mode, the playback mode, etc.) of the digital camera 1. The shooting mode indicator lamp 33 and the playback mode indicator lamp 34 are composed of LED's (Light Emission Diode) for example, and light up or flash when the digital camera 1 is in the shooting mode or the playback mode.

There are provided operation buttons 35 in the lower part of the surface 11-1 of the body unit 11 (below the place where the attachment unit 21 is attached). The operation buttons 35 are operated at the time of providing an instruction as to shooting or playback. Further, in the case where there is displayed a menu screen for various settings of the digital camera 1 on a display panel 42, the operation buttons 35 are operated at the time of making various settings on the menu screen.

There are provided operation buttons 41 (at the left side in FIG. 1) and the display panel 42 (at the right side in FIG. 1) in the display panel unit 22 of the display unit 12. Since the operation buttons 35 are provided at the display panel 42 side, the user can easily operate the operation buttons 35 while viewing an image displayed on the display panel 42.

The operation buttons 41 are composed of operation buttons 41a to 41c. As in the case of the operation buttons 35, the operation buttons 41 are operated at the time of providing an instruction as to shooting or playback, or at the time of making various settings on the menu screen. For example, the operation button 41a is operated at the time of providing an instruction for still image shooting or file forward. The operation button 41b is operated at the time of providing an instruction for playing back a moving image from the beginning and displaying it on the display panel 42. The operation button 41c is operated at the time of providing an instruction for moving image shooting or file rewind. Thus, the operation buttons 41a and 41c have two different functions respectively. Hereinafter, in the case where it is not necessary to distinguish between a still image and a moving image, each image is referred to as an image.

The display panel 42 is composed of an LCD (liquid crystal display) panel for example. The display panel 42 displays a shot image, a playback image, etc.

Figure 2:
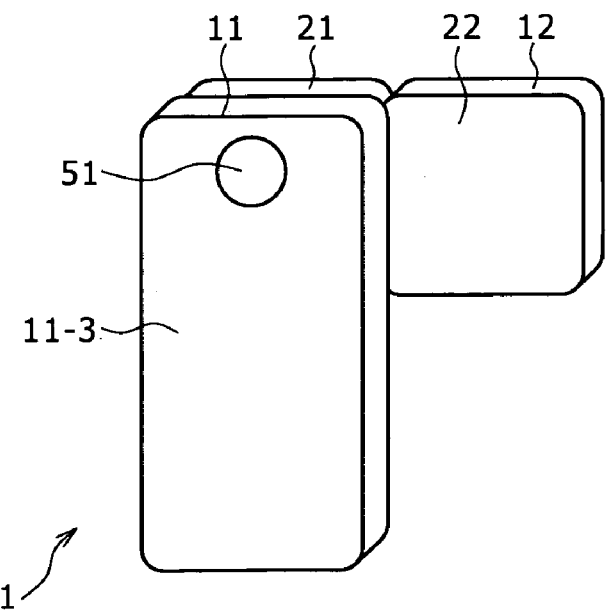
FIG. 2 is a perspective view of the digital camera in FIG. 1 viewed from the direction of arrow E in FIG. 1.

FIG. 2 is a perspective view of the digital camera 1 viewed from the direction of arrow E in FIG. 1.

There is provided a lens 51 in the top portion of a surface 11-3 of the body unit 11 in FIG. 2. The lens 51 passes light coming from a subject, for the shooting of the subject. The shooting signifies obtaining the image of a subject and displaying the obtained image on the display panel 42.

FIGS. 3A to 3D show various states of the digital camera 1.

Figure 3:
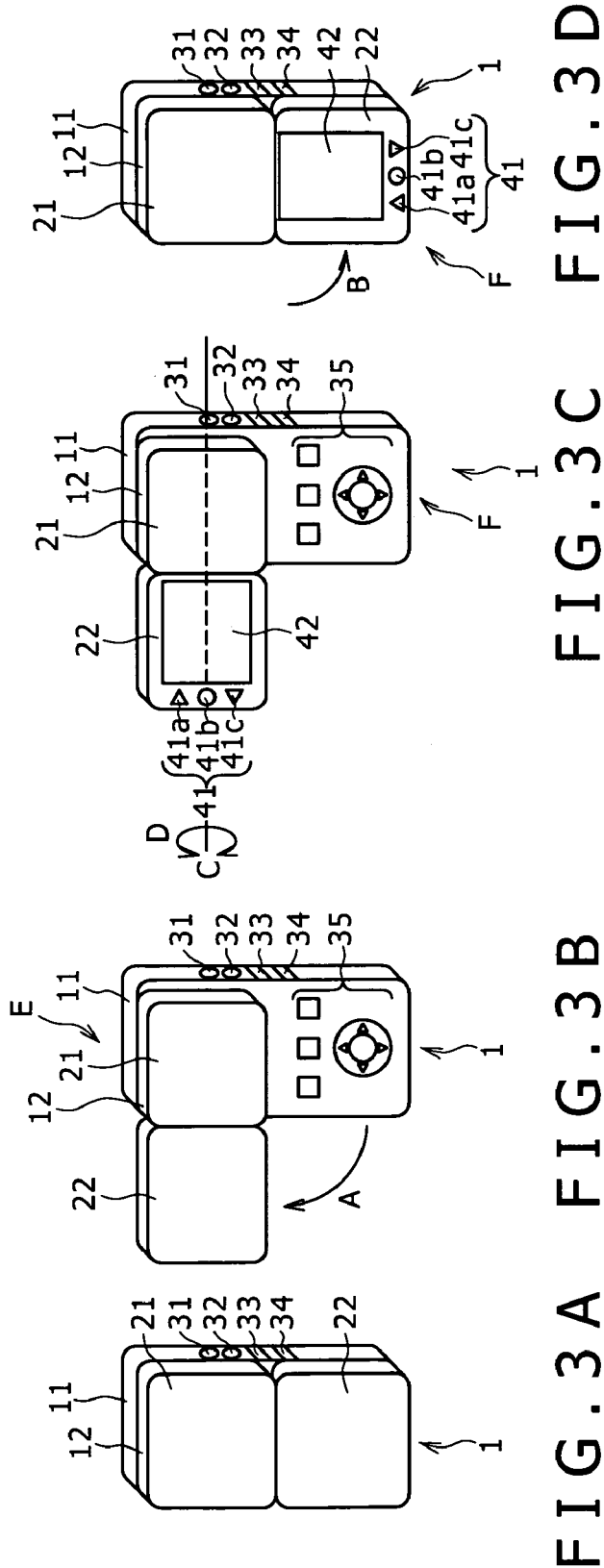
FIGS. 3A to 3D show various states of the digital camera.

FIG. 3A is a perspective view of the digital camera 1 in a state of closing the display unit 12 (the display panel unit 22 of the display unit 12) such that the display panel 42 of the display panel unit 22 faces inward. Hereinafter, the opening/closing or rotating state of the display panel unit 22 of the digital camera 1 as shown in FIG. 3A is referred to as a "state a". As shown in FIG. 3A, in the state a, the display panel 42 of the display panel unit 22 and the operation buttons 35 of the body unit 11 come into contact with each other to be housed.

The display unit 12 rotates about the attachment unit 21 with respect to the body unit 11, thereby opening/closing the display panel unit 22. Assume that the rotation angle is 0 degree in the state a.

FIG. 3B is a perspective view of the digital camera 1 in a state of opening the display unit 12 (the display panel unit 22 of the display unit 12) in the state a of FIG. 3A by rotating it 90 degrees about the attachment unit 21 in the direction of arrow A (clockwise). Hereinafter, the opening/closing or rotating state of the display panel unit 22 of the digital camera 1 as shown in FIG. 3B is referred to as a "state b". As shown in FIG. 3B, in the state b, the display panel 42 that is housed in the state a of FIG. 3A is exposed, thereby making it possible to view an image displayed on the display panel 42 from the direction of arrow E.

The display panel unit 22 rotates about axis C. Assume that the rotation angle is 0 degree in the state b.

FIG. 3C is a perspective view of the digital camera 1 in a state of rotating the display panel unit 22 in the state b of FIG. 3B by 180 degrees about axis C in the direction of arrow D (counterclockwise or clockwise). Hereinafter, the opening/closing or rotating state of the display panel unit 22 of the digital camera 1 as shown in FIG. 3C is referred to as a "state c". As shown in FIG. 3C, in the state c, the display panel 42 is exposed in the direction opposite to that of the state b of FIG. 3B, thereby making it possible to view an image displayed on the display panel 42 from the direction of arrow F opposite to arrow E.

FIG. 3D is a perspective view of the digital camera 1 in a state of closing the display unit 12 (the display panel unit 22 of the display unit 12) in the state c of FIG. 3C by rotating it 90 degrees about the attachment unit 21 in the direction of arrow B (counterclockwise). Hereinafter, the opening/closing or rotating state of the display panel unit 22 of the digital camera 1 as shown in FIG. 3D is referred to as a "state d". As shown in FIG. 3D, in the state d, the operation buttons 35 are housed, with the display panel 42 exposed. That is, in the state d, the display unit 12 is rotated and closed with respect to the body unit 11 such that the display panel 42 of the display panel unit 22 faces outward. Therefore, in the state d, it is possible to view the display panel 42 from the direction of arrow F.

Figure 4:
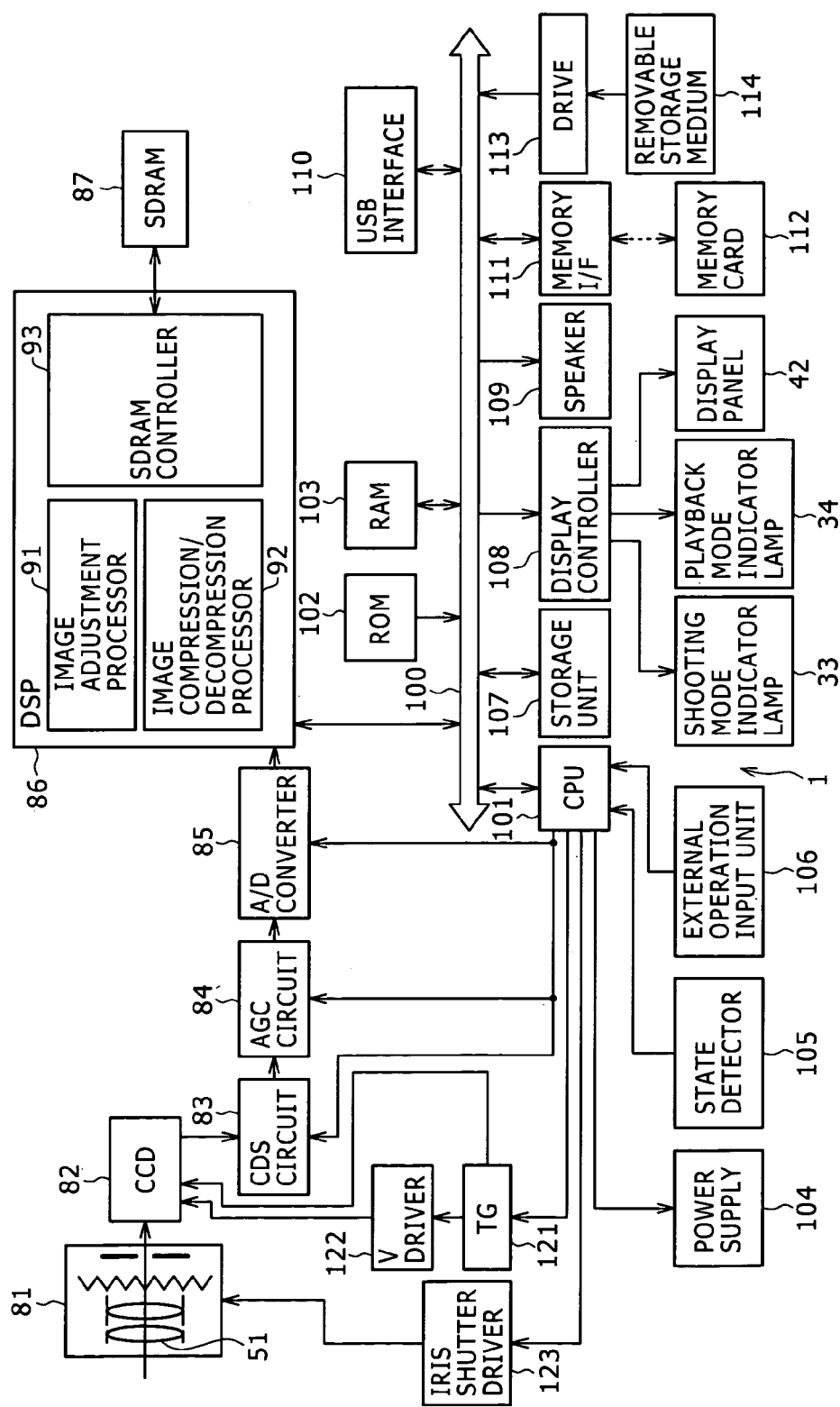
FIG. 4 is a block diagram exemplifying the internal structure of the digital camera.

FIG. 4 is a block diagram exemplifying the internal structure of the digital camera 1.

Light from a subject (not shown) is launched into a CCD (Charge Coupled Device) 82 through a lens unit 81 which is composed of the lens 51, an iris mechanism (not shown), etc. The CCD 82 performs photoelectric conversion of the light from the lens unit 81 and sends the signal to a CDS circuit (Correlated Double Sampling circuit) 83 as an analog image signal.

The CDS circuit 83 performs correlated double sampling of the image signal from the CCD 82 to remove a noise component and outputs the image, signal to an AGC circuit (Automatic Gain Control circuit) 84. The AGC circuit 84 adjusts the gain of the image signal from the CDS circuit 83 and outputs the image signal to an A/D (Analog/Digital) converter 85. The A/D converter 85 converts the analog image signal from the AGC circuit 84 into a digital signal and outputs the digital signal to a DSP (Digital Signal Processor) 86 as image data.

The DSP 86 is composed of an image adjustment processor 91, an image compression/decompression processor 92, and an SDRAM (Synchronous Dynamic Random Access Memory) controller 93. The image adjustment processor 91 in the DSP 86 generates a control signal for use in AF (Auto Focus), AE (Auto Exposure), AWB (Auto White Balance), etc. based on the image data from the A/D converter 85, and sends the control signal to a CPU (Central Processing Unit) 101 via a bus 100.

The image compression/decompression processor 92 compresses the image data with a predetermined compression/decompression method such as JPEG (Joint Photographic Expert Group) so as to generate compression/decompression data while controlling the SDRAM controller 93 to temporarily store the image data received from the A/D converter 85 into an SDRAM 87.

Further, the image compression/decompression processor 92 sends the compressed image data to a RAM (Random Access Memory) 103 via the bus 100 for storage. Furthermore, the image compression/decompression processor 92 decompresses compressed image data stored in the RAM 103, a storage unit 107, or a memory card 112 as necessary and sends the decompressed data to a display controller 108.

The SDRAM controller 93 temporarily stores the image data from the A/D converter 85 in the SDRAM 87 in accordance with the control of the image compression/decompression processor 92. Further, the SDRAM controller 93 reads image data stored in the SDRAM 87 and sends the image data to the image compression/decompression processor 92. The SDRAM 87 stores the image data from the A/D converter 85. The CPU 101, a ROM (Read Only Memory) 102, and the RAM 103 are interconnected via the bus 100. The bus 100 is also connected to the storage unit 107, the display controller 108, a speaker 109, a USB (Universal Serial Bus) interface 110, and a memory I/F (Interface) 111.

The CPU 101 controls each unit and executes various processes in accordance with a program stored in the ROM 102 or a program loaded into the RAM 103 from the storage unit 107.

The CPU 101 is connected to a power supply 104, a state detector 105, and an external operation input unit 106. The CPU 101 controls power supply from the power supply 104 to each unit based on a state signal representing the state a, b, c or d of the display panel unit 22 from the state detector 105 and an operation signal representing an operation by the user from the external operation input unit 106. That is, the CPU 101 controls power-on or power-off. Further, the CPU 101 sets an operation mode of the digital camera 1 based on a state signal, an operation signal, or connection information from the USB interface 110.

Further, the CPU 101 controls the operations of the CDS circuit 83, the AGC circuit 84, and the A/D converter 85 based on an operation signal from the external operation input unit 106, control information from the image adjustment processor 91, or information obtained by executing various programs. Furthermore, the CPU 101 controls a TG (Timing Generator) 121 and a V driver 122 which control the drive of the CCD 82 to control the operation of the CCD 82. Moreover, the CPU 101 controls an iris shutter driver 123 which controls the operation of the lens unit 81 to adjust shutter speed and the iris mechanism.

Thus, the CPU 101 controls the CDS circuit 83, the AGC circuit 84, and the A/D converter 85, the TG 121 and the V driver 122, and the iris shutter driver 123, and thereby obtains a moving image (moving image data) of a subject or a still image (still image data) in units of frames for example. Further, the CPU 101 stores the obtained moving image data or still image data into the RAM 103 and sends the image data to a display controller 108 to display the image corresponding to the image data on the display panel 42. In this manner, the shooting of the subject is performed.

Further, the CPU 101 reads the shot image from the RAM 103 based on an operation signal from the external operation input unit 106 and records the image data in the memory card 112 through the storage unit 107 or the memory I/F 111.

Furthermore, the CPU 101 reads (plays back) image data recorded in the storage unit 107 or the memory card 112 based on an operation signal from the external operation input unit 106 and sends the image data to the image compression/decompression processor 92. The image compression/decompression processor 92 decompresses the playback image data.

The ROM 102 stores, for example, a program executed by the CPU 101. The RAM 103 stores, for example, data that is necessary for the CPU 101 to execute various processes appropriately. Further, the RAM 103 stores compressed image data provided from the image compression/decompression processor 92 via the bus 100.

The power supply 104 supplies power to each unit based on the control of the CPU 101. The state detector 105 detects the opening/closing or rotating state a, b, c or d of the display panel unit 22, and sends the state signal representing the detected state to the CPU 101.

The external operation input unit 106 is composed of various kinds of buttons, dials, knobs, and a touch panel (not shown), as well as the power button 31, the mode switching button 32, the operation buttons 35 and 41. The external operation input unit 106 accepts an operation by the user and sends the operation signal representing the operation to the CPU 101.

The storage unit 107 includes a nonvolatile semiconductor memory, a hard disk, and the like. For example, compressed image data stored in the RAM 103 is provided to the storage unit 107, which records the compressed image data.

The display controller 108 has a VRAM (Video Random Access Memory) (not shown) built-in. The display controller 108 allows the built-in VRAM to store playback image data decompressed by the DSP 86 and displays the playback image corresponding to the playback image data stored in the VRAM on the display panel 42.

Further, the display controller 108 allows a shooting mode indicator lamp 33 to light up if the operation mode of the digital camera 1 is the shooting mode, and allows a playback mode indicator lamp 34 to light up if the operation mode of the digital camera 1 is the playback mode.

The speaker 109 outputs a specified sound under the control of the CPU 101. For example, the speaker 109 outputs music (sound) for informing the user that the operation mode of the digital camera 1 has switched.

The USB (Universal Serial Bus) interface 110 transfers compressed image data stored in the ROM 102 etc. to another apparatus via a USB cable (not shown). Further, the USB interface 110 sends connection information indicating whether a USB cable is connected or not, to the CPU 101.

The memory card 112 is inserted into the memory I/F 111. Compressed image data stored in the RAM 103 is provided to the memory I/F 111, which records the compressed image data in the memory card 112. Further, the memory I/F 111 reads compressed image data stored in the memory card 112 and sends the compressed image data to the image compression/decompression processor 92. Furthermore, the memory I/F 111 reads a program from the memory card 112 as necessary and installs the program into the storage unit 107, the RAM 103, or the like. The memory card 112 records compressed image data etc. stored in the RAM 103.

The bus 100 is also connected to a drive 113 via an interface (not shown) as necessary. A program is read out from a removable storage medium 114 such as a CD-ROM (Compact Disc Read Only Memory), an MO (Magneto-Optical) disk, a DVD (Digital Versatile Disc), a magnetic disk, a semiconductor memory and installed into the storage unit 107, the RAM 103, or the like.

Figure 5:
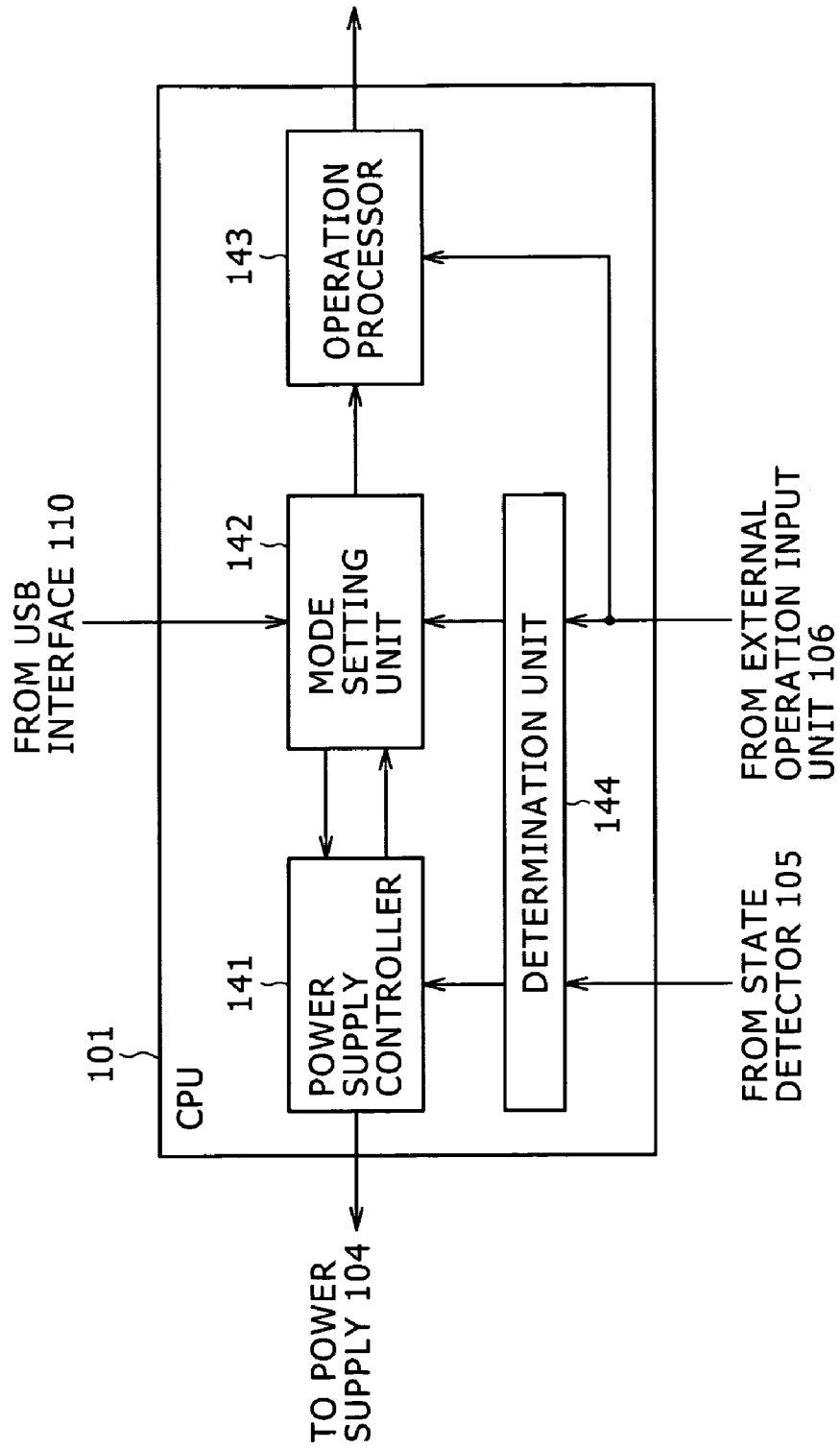
FIG. 5 is a block diagram exemplifying the detailed structure of a CPU in FIG. 4.

FIG. 5 is a block diagram exemplifying the detailed structure of the CPU 101 in FIG. 4.

The CPU 101 in FIG. 5 is composed of a power supply controller 141, a mode setting unit 142, an operation processor 143, and a determination unit 144.

The power supply controller 141 controls the power supply 104 to turn the power on or off-based on a mode signal representing a set operation mode from the mode setting unit 142 or a determination result from the determination unit 144. Further, the power supply controller 141 sends a state of the power, that is, a power state signal representing power-on or power-off, to the mode setting unit 142.

The mode setting unit 142 sets an operation mode of the digital camera 1 to the shooting mode or the playback mode based on a power state signal from the power supply controller 141 or a determination result from the determination unit 144, and sends a mode signal to the operation processor 143. Further, the mode setting unit 142 sets an operation mode of the digital camera 1 to a USB mode based on connection information from the USB interface 110. Furthermore, the mode setting unit 142 sends a mode signal representing a set operation mode to the power supply controller 141 and the operation processor 143.

The operation processor 143 controls each unit based on a mode signal from the mode setting unit 142 and an operation signal from the external operation input unit 106 so as to perform processing corresponding to an operation by the user.

The determination unit 144 determines the state a, b, c or d of the display panel unit 22 based on a state signal from the state detector 105 and sends the determination result to the power supply controller 141 or the mode setting unit 142. Further, the determination unit 144 determines an operation by the user based on an operation signal from the external operation input unit 106 and sends the determination result to the power supply controller 141 or the mode setting unit 142.

FIGS. 6 to 9 are illustrations explaining transitions of the operation modes of the digital camera 1.

FIG. 6 shows the transitions of the operation modes of the digital camera 1 in the case where a USB cable (not shown) is not connected to the USB interface 110 of the digital camera As shown in FIG. 6, let us assume that the power is off and the operation mode is a power-off mode 161 in the state a of the display panel unit 22 in the digital camera 1. When a user operates the power button 31 to give an instruction for power-on, the power is turned on and the operation mode of the digital camera 1 transitions from the power-off mode 161 to a shooting mode 162 in which the user shoots a subject and records the obtained image (transition A1).

In the state a, the display panel 42 is housed so that the user cannot view an image displayed on the display panel 42. Accordingly, in the shooting mode 162, the display (power) of the display panel 42 is off (power is not supplied to the display panel 42), thereby making it possible to reduce the power consumption of the digital camera 1.

Further, assume that the power is off and the operation mode is the power-off mode 161 in the state a. When the user changes the state of the display panel unit 22 from the state a to the state b, the power is turned on and the operation mode of the digital camera 1 transitions from the power-off mode 161 to a shooting mode 164 (transition A2). Thus, the user can shoot the subject immediately, only by changing the state of the display panel unit 22 from the state a to the state b. Further, the user can turn the power on, only by changing the state of the display panel unit 22 from the state a to the state b. Consequently, the user's time and effort can be saved.

In the state b of the display panel unit 22, the display panel 42 is exposed so that the user can view an image displayed on the display panel 42. Accordingly, in the shooting mode 164, the display panel 42 is turned on. Further, in the state b, the lens 51 and the display panel 42 can be viewed from the same direction of arrow E in FIG. 3B. Accordingly, in the shooting mode 164, the user can shoot himself/herself as a subject and give an instruction for recording while viewing an image displayed on the display panel 42, for "self-shooting".

Assume that the operation mode is the shooting mode 162 in the state a. When the user operates the power button 31 to give an instruction for power-off, the operation mode of the digital camera 1 transitions from the shooting mode 162 to the power-off mode 161 (transition A3) and the power is turned off.

Further, assume that the operation mode is the shooting mode 162 in the state a. When the user changes the state of the display panel unit 22 from the state a to the state b, the operation mode of the digital camera 1 transitions from the shooting mode 162 to the shooting mode 164 (transition A4).

In the state a, the user cannot view an image displayed on the display panel 42. Accordingly, there is no setting of the playback mode in which the user displays an image on the display panel 42.

Assume that the power is off and the operation mode is a power-off mode 163 in the state b. When the user operates the power button 31 to give an instruction for power-on, the power is turned on and the operation mode of the digital camera 1 transitions from the power-off mode 163 to the shooting mode 164 (transition A5). Assume that the operation mode is the shooting mode 164 in the state b. When the user operates the power button 31 to give an instruction for power-off, the operation mode of the digital camera 1 transitions from the shooting mode 164 to the power-off mode 163 (transition A6) and the power is turned off.

Further, assume that the operation mode is the shooting mode 164 in the state b. When the user changes the state of the display panel unit 22 from the state b to the state a, the operation mode of the digital camera 1 transitions from the shooting mode 164 to the power-off mode 161 (transition A7) and the power is turned off. Thus, the user can turn the power off, only by changing the state of the display panel unit 22 from the state b to the state a. Consequently, the user's time and effort can be saved.

Furthermore, assume that the operation mode is the shooting mode 164 in the state b. When the user changes the state of the display panel unit 22 from the state b to the state c, the operation mode of the digital camera 1 transitions from the shooting mode 164 to the shooting mode 167 (transition A8). At this time, since the display panel 42 is rotated 180 degrees about axis C in the direction of arrow D as shown in FIG. 3C, the display panel 42 is turned upside down in the state c compared to the state b. Therefore, in transition A8, an image displayed on the display panel 42 is turned upside down.

In the state c of the display panel unit 22, the display panel 42 is exposed to the surface 11-1 side opposite to the surface 11-3 side of the body unit 11 where the lens 51 is provided. Accordingly, in the shooting mode 167, the user who is at the surface 11-1 side of the body unit 11 shoots the subject that is at the surface 11-3 side of the body unit 11, and gives an instruction for recording while viewing an image displayed on the display panel 42.

Further, assume that the operation mode is the shooting mode 164 in the state b. When the user operates the mode switching button 32 to give an instruction for changing the operation mode, the operation mode of the digital camera 1 transitions from the shooting mode 164 to a playback mode 165 in which the user displays an image played back from the storage unit 107 or the memory card 112 on the display panel 42 (transition A9). At this time, the speaker 109 outputs music for informing the user that the operation mode has switched, the shooting mode indicator lamp 33 goes out, and the playback mode indicator lamp 34 lights up, thereby enabling the user to easily recognize that the operation mode has switched.

In the state b, the display panel 42 and the lens 51 provided on the surface 11-3 of the body unit 11 can be viewed from the same direction of arrow E in FIG. 3B. Accordingly, in the playback mode 165, the digital camera 1 can show a playback image to a user who is not at the surface 11-1 side of the body unit 11 but is at the opposite surface 11-3 side of the body unit 11.

Assume that the operation mode is the playback mode 165 in the state b. When the user operates the mode switching button 32 to give an instruction for changing the operation mode, the operation mode of the digital camera 1 transitions from the playback mode 165 to the shooting mode 164 (transition A10). At this time, the speaker 109 outputs music for informing the user that the operation mode has switched, the playback mode indicator lamp 34 goes out, and the shooting mode indicator lamp 33 lights up.

Furthermore, the music outputted from the speaker 109 in the case where the operation mode of the digital camera 1 transitions from the shooting mode 164 to the playback mode 165 (transition A9) and the music outputted from the speaker 109 in the case where the operation mode of the digital camera 1 transitions from the playback mode 165 to the shooting mode 164 (transition A10) may be the same or may be different. If the musics outputted from the speaker 109 are different, the user can easily determine, by the outputted music, whether the operation mode has been transitioned (switched) to the playback mode 165 or transitioned to the shooting mode 164.

Further, assume that the operation mode is the playback mode 165 in the state b. When the user operates the power button 31 to give an instruction for power-off, the operation mode of the digital camera 1 transitions from the playback mode 165 to the power-off mode 163 (transition A11) and the power is turned off. Furthermore, assume that the operation mode is the playback mode 165 in the state b. When the user changes the state of the display panel unit 22 from the state b to the state a, the operation mode of the digital camera 1 transitions from the playback mode 165 to the power-off mode 161 (transition A12) and the power is turned off.

Further, assume that the operation mode is the playback mode 165 in the state b. When the user changes the state of the display panel unit 22 from the state b to the state c, the operation mode of the digital camera 1 transitions from the playback mode 165 to the playback mode 168 (transition A13). In the state c, the display panel 42 is exposed to the front surface 11-1 side opposite to the back surface 11-3 side of the body unit 11 where the lens 51 is provided. Accordingly, in the playback mode 168, the digital camera 1 shows a playback image to the user who is at the front surface side of the body unit 11.

Assume that the power is off and the operation mode is a power-off mode 166 in the state c. When the user operates the power button 31 to give an instruction for power-on, the power is turned on and the operation mode of the digital camera 1 transitions from the power-off mode 166 to the shooting mode 167 (transition A14). Assume that the operation mode is the shooting mode 167 in the state c. When the user operates the power button 31 to give an instruction for power-off, the operation mode of the digital camera 1 transitions from the shooting mode 167 to the power-off mode 166 (transition A15) and the power is turned off.

Further, assume that the operation mode is the shooting mode 167 in the state c. When the user changes the state of the display panel unit 22 from the state c to the state b, the operation mode of the digital camera 1 transitions from the shooting mode 167 to the shooting mode 164 (transition A16). Furthermore, assume that the operation mode is the shooting mode 167 in the state c. When the user changes the state of the display panel unit 22 from the state c to the state d, the operation mode of the digital camera 1 transitions from the shooting mode 167 to a power-off mode 169 (transition A17) and the power is turned off.

Further, assume that the operation mode is the shooting mode 167 in the state c. When the user operates the mode switching button 32 to give an instruction for changing the operation mode, the operation mode of the digital camera 1 transitions from the shooting mode 167 to a playback mode 168 (transition A18). At this time, the speaker 109 outputs music for informing the user that the operation mode has switched, as in the case of transition A9. In addition, the shooting mode indicator lamp 33 goes out, and the playback mode indicator lamp 34 lights up.

Assume that the operation mode is the playback mode 168 in the state c. When the user operates the mode switching button 32 to give an instruction for changing the operation mode, the operation mode of the digital camera 1 transitions from the playback mode 168 to the shooting mode 167 (transition A19). At this time, the speaker 109 outputs music for informing the user that the operation mode has switched, as in the case of transition A10. In addition, the playback mode indicator lamp 34 goes out, and the shooting mode indicator lamp 33 lights up.

Further, assume that the operation mode is the playback mode 168 in the state c. When the user operates the power button 31 to give an instruction for power-off, the operation mode of the digital camera 1 transitions from the playback mode 168 to the power-off mode 166 (transition A20) and the power is turned off. Furthermore, assume that the operation mode is the playback mode 168 in the state c. When the user changes the state of the display panel unit 22 from the state c to the state b, the operation mode of the digital camera 1 transitions from the playback mode 168 to the playback mode 165 (transition A21).

Further, assume that the operation mode is the playback mode 168 in the state c. When the user changes the state of the display panel unit 22 from the state c to the state d, the operation mode of the digital camera 1 transitions from the playback mode 168 to a playback mode 170 (transition A22). Even if the user thus changes the state of the display panel unit 22 from the state c to the state d in the playback mode 168, the power remains turned on and the operation mode becomes the playback mode 170, thus enabling the user to enjoy the playback image without stopping.

In the state d of the display panel unit 22, the display panel 42 is closed with respect to the body unit 11. Accordingly, in the playback mode 170, there are many cases where multiple users view an image played back from a recorded image after shooting. That is, in the playback mode 170, the digital camera 1 can show a playback image to multiple users who share it.

Assume that the power is off and the operation mode is the power-off mode 169 in the state d. When the user operates the power button 31 to give an instruction for power-on, the power is turned on and the operation mode of the digital camera 1 transitions from the power-off mode 169 to the playback mode 170 (transition A23). In the state d, since the display panel 42 is closed, there are many cases where the user does not shoot an image but plays back a recorded image to view it. Accordingly, in the state d, the operation mode at power-on is set to the playback mode, thereby enabling the operation mode of the digital camera 1 to be an optimal operation mode for the user.

Further, assume that the operation mode is the power-off mode 168 in the state d. When the user changes the state of the display panel unit 22 from the state d to the state c, the power is turned on and the operation mode of the digital camera 1 transitions from the power-off mode 169 to the shooting mode 167 (transition A24).

Assume that the operation mode is the playback mode 170 in the state d. When the user operates the power button 31 to give an instruction for power-off, the operation mode of the digital camera 1 transitions from the playback mode 170 to the power-off mode 169 (transition A25) and the power is turned off.

Further, assume that the operation mode is the playback mode 170 in the stated. When the user changes the state of the display panel unit 22 from the state d to the state c, the operation mode of the digital camera 1 transitions from the playback mode 170 to the playback mode 168 (transition A26).

In the state d, since the display panel 42 is closed and there are many cases where the user does not shoot an image but plays back a recorded image to view it as described above, there is no setting of the shooting mode in which the user shoots the subject and records the obtained image.

As described above, in the states b and c, the operation mode at power-on is the shooting mode 164 or 167 (transitions A2, A5, A14, and A24). In the states b and c, since the display panel 42 is opened with respect to the body unit 11, there is a high possibility that the user shoots an image. Accordingly, in the states b and c, the operation mode at power-on is set to the shooting mode 164 or 167 in which the user shoots the subject and records the obtained image, thereby enabling the operation mode of the digital camera 1 to be an optimal operation mode for the user.

Further, when the user opens the display panel 42, that is, the user changes the state of the display panel unit 22 from the state a to the state b or from the state d to the state c, the power is turned on. In the case where the display panel 42 is opened, there is a high possibility that the user uses the digital camera 1. Accordingly, when the display panel 42 is opened, the power is turned on, thereby making it possible to improve the usability.

FIG. 7 shows the transitions of the operation modes of the digital camera 1 in the case where a USB cable is connected to the USB interface 110 (in FIG. 4) of the digital camera 1.

As shown in FIG. 7, let us assume that the power is off and the operation mode is a power-off mode 191 in the state a of the display panel unit 22 in the digital camera 1 to which a USB cable is connected. When the user operates the power button 31 to give an instruction for power-on, the power is turned on and the operation mode of the digital camera 1 transitions from the power-off mode 191 to a USB mode 195 (transition B1). The USB mode 195 refers to the operation mode in which the USB interface 110 transfers compressed image data stored in the ROM 102 etc. to another apparatus via the USB cable. Further, the operation by the user of the mode switching button 32 is disabled in the USB mode.

Assume that the operation mode is the USB mode 195 in the state a of the digital camera 1 to which the USB cable is connected. When the user operates the power button 31 to give an instruction for power-off, the operation mode of the digital camera 1 transitions from the USB mode 195 to the power-off mode 191 (transition B2) and the power is turned off.

As in the case of the state a, assume that the power is off and the operation mode is a power-off mode 192 in the state b of the display panel unit 22 in the digital camera 1 to which the USB cable is connected. When the user operates the power button 31 to give an instruction for power-on, the power is turned on and the operation mode of the digital camera 1 transitions from the power-off mode 192 to the USB mode 195 (transition B3) Assume that the operation mode is the USB mode 195 in the state b. When the user operates the power button 31 to give an instruction for power-off, the operation mode of the digital camera 1 transitions from the USB mode 195 to the power-off mode 192 (transition B4) and the power is turned off.

Further, assume that the operation mode is the USB mode 195 in the state b of the display panel unit 22 in the digital camera 1 to which the USB cable is connected. When the user changes the state of the display panel unit 22 from the state b to the state a, the operation mode of the digital camera 1 transitions from the USB mode 195 to the power-off mode 191 (transition B5) and the power is turned off.

In general, the user selects compressed image data to be transferred to another apparatus via the USB cable while viewing the display panel 42 and gives an instruction for transfer. However, in the state a, the display panel 42 is housed so that the user cannot view an image displayed on the display panel 42. Accordingly, when the state of the display panel unit 22 is changed from the state b to the state a, the operation mode is switched from the USB mode 195 to the power-off mode 191, thereby enabling the operation mode of the digital camera 1 to be an optimal operation mode for the user.

As in the case of the state a, assume that the power is off and the operation mode is a power-off mode 193 in the state c of the display panel unit 22 in the digital camera 1 to which the USB cable is connected. When the user operates the power button 31 to give an instruction for power-on, the power is turned on and the operation mode of the digital camera 1 transitions from the power-off mode 193 to the USB mode 195 (transition B6) Assume that the operation mode is the USB mode 195 in the state c. When the user operates the power button 31 to give an instruction for power-off, the operation mode of the digital camera 1 transitions from the USB mode 195 to the power-off mode 193 (transition B7) and the power is turned off.

As in the case of the state a or c, assume that the power is off and the operation mode is a power-off mode 194 in the state d of the display panel unit 22 in the digital camera 1 to which the USB cable is connected. When the user operates the power button 31 to give an instruction for power-on, the power is turned on and the operation mode of the digital camera 1 transitions from the power-off mode 194 to the USB mode 195 (transition B8). Assume that the operation mode is the USB mode 195 in the state d. When the user operates the power button 31 to give an instruction for power-off, the operation mode of the digital camera 1 transitions from the USB mode 195 to the power-off mode 194 (transition B9) and the power is turned off.

FIG. 8 shows the relationship between the changes of the states of the display panel unit 22 and the transitions of the operation modes.

In FIG. 8, a state change C1 refers to a change of the state of the display panel unit 22 from the state a to the state b. In the same manner, a state change C2 refers to a change of the state of the display panel unit 22 from the state b to the state a. A state change C3 refers to a change from the state b to the state c. A state change C4 refers to a change from the state c to the state b. A state change C5 refers to a change from the state d to the state c. A state change C6 refers to a change from the state c to the state d.

For example, as shown in the first line with the exception of the heading line in the table of FIG. 8, in the case of the state change C1, if the power of the digital camera 1 is off and the operation mode of the digital camera 1 before transition is the power-off mode 161 (FIG. 6), the operation mode after transition is the shooting mode 164 (transition A2). Further, as shown in the third line in the table of FIG. 8, in the case of the state change C1, if the operation mode of the digital camera 1 before transition is the USB mode 195 (FIG. 7), the operation mode after transition remains the USB mode 195 (no transition).

FIG. 9 shows the relationship between the operations by the user of the power button 31 and the mode switching button 32 and the transitions of the operation modes.

For example, as shown in the first line with the exception of the heading line in the table of FIG. 9, assume that the power is off and the operation mode is the power-off mode 161 (FIG. 6) in the state a. When the user operates the power button 31 to give an instruction for power-on, the power is turned on and the operation mode transitions to the shooting mode 162 (transition A1).

Further, as shown in the ninth line in the table of FIG. 9, assume that the operation mode is the shooting mode 162 in the state a. When the user operates the mode switching button 32 to give an instruction for changing the operation mode, the power is turned off as error handling because there is no setting of the playback mode in the state a. In the same manner, as shown in the 17th line in the table of FIG. 9, assume that the operation mode is the playback mode 170 in the state d. When the user operates the mode switching button 32 to give an instruction for changing the operation mode, the power is turned off as error handling because there is no setting of the shooting mode in the state d.

FIG. 10 is a flowchart explaining a display panel state process in which the digital camera 1 sets an operation mode in accordance with the state a, b, c or d of the display panel unit 22. The display panel state process is initiated when, for example, a change of the state a, b, c or d of the display panel unit 22 is detected, that is, a state represented by a state signal from the state detector 105 (FIG. 4) has changed.

At step S11, the determination unit 144 (FIG. 5) determines whether the display panel unit 22 has changed from the state a to the state b or from the state d to the state c, based on a state signal from the state detector 105. More specifically, the state detector 105 detects the state a, b, c or d of the display panel unit 22 and sends the state signal representing the state a, b, c or d to the determination unit 144. The determination unit 144 determines whether the display panel unit 22 has changed from the state a to the state b or from the state d to the state c, based on the state a, b, c or d represented by the state signal from the state detector 105.

If the determination unit 144 determines at step S11 that the display panel unit 22 has changed from the state a to the state b or from the state d to the state c, the determination unit 144 sends the determination result to the power supply controller 141 and the mode setting unit 142, and the process goes to step S12.

At step S12, the power supply controller 141 determines whether the power is on, that is, whether the power is on by controlling the power supply 104. If the power supply controller 141 determines that the power is on, the process ends. That is, when the display panel unit 22 has changed from the state a to the state b or from the state d to the state c in the case where the power is on, the power stays on and the operation mode is not changed (transitions A4 and A26 in FIG. 6). For example, assume that the power is on and the operation mode before transition is the shooting mode 162 (FIG. 6). When the display panel unit 22 changes from the state a to the state b, transition A4 is performed and the operation mode after transition is the shooting mode 164. Consequently; the operation mode is still the shooting mode.

On the other hand, if the power supply controller 141 determines at step S12 that the power is not on, that is, the power is off, the process goes to step S13, where the power supply controller 141 controls the power supply 104 to turn the power on, and the process goes to step S14.

At step S14, the mode setting unit 142 sets the operation mode to the shooting mode 162 or 167, and the process ends. That is, when the display panel unit 22 has changed from the state a to the state b in the case where the power is off, the power is turned on and the operation mode is set to the shooting mode 162 or 167 (transitions A2 and A24 in FIG. 6).

Further, if the determination unit 144 determines at step S11 that the display panel unit 22 has not changed from the state a to the state b or from the state d to the state c, the process goes to step S15, where the determination unit 144 determines whether the display panel unit 22 has changed from the state b to the state a. If the determination unit 144 determines at step S15 that the display panel unit 22 has changed from the state b to the state a, the determination unit 144 sends the determination result to the power supply controller 141, and the process goes to step S16.

At step S16, the power supply controller 141 controls the power supply 104 to turn the power off, and the process ends. That is, when the display panel unit 22 has changed from the state b to the state a, the power is turned off. (transitions A7, A12, and B5 in FIGS. 6 and 7).

Further, if the determination unit 144 determines at step S15 that the display panel unit 22 has not changed from the state b to the state a, the process goes to step S17, where the determination unit 144 determines whether the display panel unit 22 has changed from the state c to the state d. If the determination unit 144 determines at step S17 that the display panel unit 22 has changed from the state c to the state d, the determination unit 144 sends the determination result to the power supply controller 141 and the mode setting unit 142, and the process goes to step S18.

At step S18, the power supply controller 141 determines whether the power is on. If the power supply controller 141 determines that the power is not on, that is, the power is off, the process ends. That is, when the display panel unit 22 has changed from the state c to the state d in the case where the power is off, the power stays off.

On the other hand, if the power supply controller 141 determines at step S18 that the power is on, the power supply controller 141 sends a power state signal representing power-on to the mode setting unit 142, and the process goes to step S19. At step S19, the mode setting unit 142 determines whether the operation mode is the shooting mode 167 (FIG. 6). If the mode setting unit 142 determines at step S19 that the operation mode is the shooting mode 167, the mode setting unit 142 sends a mode signal representing the shooting mode 167 to the power supply controller 141, and the process goes to step S16. That is, when the display panel unit 22 has changed from the state c to the state d in the case where the power is on and the operation mode is the shooting mode 167, the power is turned off (transition A17 in FIG. 6).

Further, if the mode setting unit 142 determines at step S19 that the operation mode is not the shooting mode 167, that is, the operation mode is the playback mode 168 or the USB mode 195, the process ends. That is, when the display panel unit 22 has changed from the state c to the state d in the case where the power is on and the operation mode is the playback mode 168 or the USB mode 195, the power stays on and the operation mode is not changed (transition A22 in FIG. 6).

If the determination unit 144 determines at step S17 that the display panel unit 22 has not changed from the state c to the state d, the process ends. That is, when the display panel unit 22 has changed from the state b to the state c or from the state c to the state b, the power state (on or off) and the operation mode are not changed (transitions A8, A13, A16, and A21 in FIG. 6).

Figure 11:
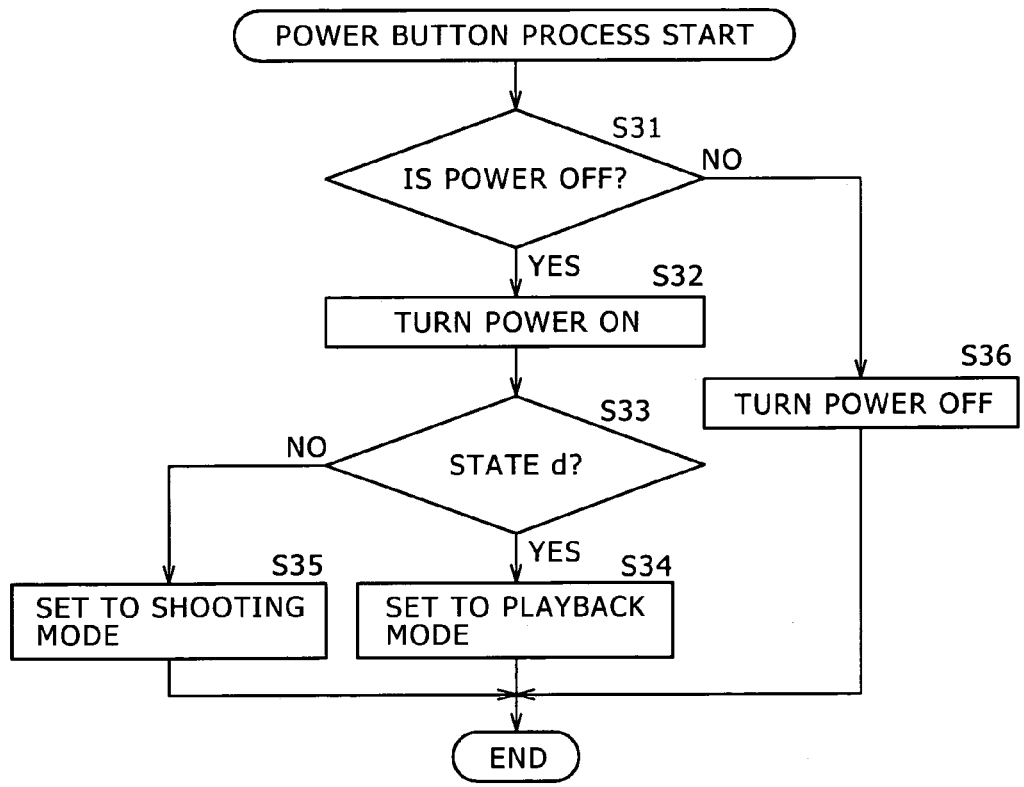
FIG. 11 is a flowchart explaining a power button process in which the digital camera sets an operation mode in accordance with an operation by a user of a power button.

FIG. 11 is a flowchart explaining a power button process in which the digital camera 1 sets an operation mode in accordance with an operation by the user of the power button 31. The power button process is initiated when, for example, a determination result that an operation signal representing an operation of the power button 31 is provided from the external operation input unit 106 is provided to the power supply controller 141 and the mode setting unit 142 from the determination unit 144.

At step S31, the power supply controller 141 determines whether the power is off. If the power supply controller 141 determines that the power is off, the process goes to step S32, where the power supply controller 141 controls the power supply 104 to turn the power on, and the process goes to step S33.

At step S33, the determination unit 144 determines whether the display panel unit 22 is in the state d, based on a state signal from the state detector 105. If the determination unit 144 determines that the display panel unit 22 is in the state d, the determination unit 144 sends the determination result to the mode setting unit 142, and the process goes to step S34.

At step S34, the mode setting unit 142 sets the operation mode to the playback mode 170 (FIG. 6), and the process ends. That is, when the power button 31 is operated in the case where the power is off and the display panel unit 22 is in the state d, the power is turned on and the operation mode is set to the playback mode 170 (transition A23 in FIG. 6).

On the other hand, if the determination unit 144 determines at step S33 that the display panel unit 22 is not in the state d, that is, the display panel unit 22 is in the state a, b or c, the mode setting unit 142 sets the operation mode to the shooting mode 162, 164 or 167, and the process ends. That is, when the power button 31 is operated in the case where the power is off and the display panel unit 22 is in the state a, b or c, the power is turned on and the operation mode is set to the shooting mode 162, 164 or 167 (transitions A1, A5, and A14 in FIG. 6).

Further, if the power supply controller 141 determines at step S31 that the power is not off, that is, the power is on, the process goes to step S36, where the power supply controller 141 controls the power supply 104 to turn the power off, and the process ends. That is, when the power button 31 is operated in the case where the power is on, the power is turned off (transitions A3, A6, A11, A15, A20, and A25 in FIG. 6).

Figure 12:
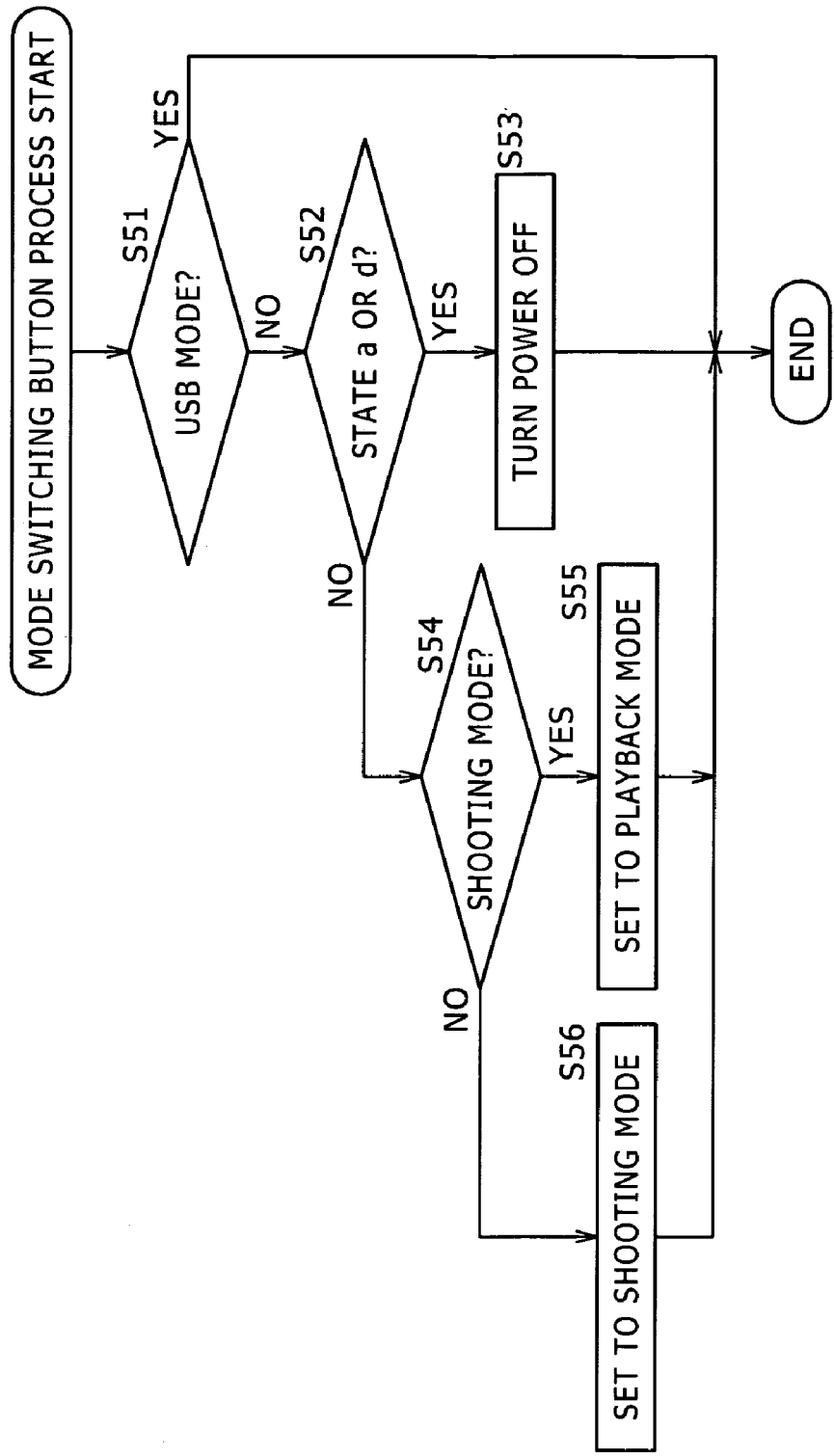
FIG. 12 is a flowchart explaining a mode switching button process in which the digital camera sets an operation mode in accordance with an operation by a user of a mode switching button.

FIG. 12 is a flowchart explaining a mode switching button process in which the digital camera 1 sets an operation mode in accordance with an operation by the user of the mode switching button 32. The mode switching button process is initiated when, for example, a determination result that an operation signal representing an operation of the mode switching button 32 is provided from the external operation input unit 106 is provided to the mode setting unit 142 from the determination unit 144, in the case where the power is on.

At step S51, the mode setting unit 142 determines whether the operation mode is the USB mode 195 (FIG. 7). If the mode setting unit 142 determines that the operation mode is the USB mode, the process ends. That is, when the mode switching button 32 is operated in the case where the operation mode is the USB mode 195, the operation of the mode switching button 32 is disabled.

On the other hand, if the mode setting unit 142 determines at step S51 that the operation mode is not the USB mode 195, the process goes to step S52, where the determination unit 144 determines whether the display panel unit 22 is in the state a or d, based on a state signal from the state detector 105.

If the determination unit 144 determines at step S52 that the display panel unit 22 is in the state a or d, the determination unit 144 sends the determination result to the power supply controller 141, and the process goes to step S53, where the power supply controller 141 controls the power supply 104 to turn the power off, and the process ends. As described above, there is no setting of the playback mode in the state a of the display panel unit 22, and there is no setting of the shooting mode in the state d of the display panel unit 22. Therefore, when the mode switching button 32 is operated in the case where the display panel unit 22 is in the state a or d, the power is turned off as error handling.

If the determination unit 144 determines at step S52 that the display panel unit 22 is not in the state a or d, that is, the display panel unit 22 is in the state b or c, the determination unit 144 sends the determination result to the mode setting unit 142, and the process goes to step S54, where the mode setting unit 142 determines whether the operation mode is the shooting mode 164 or 167 (FIG. 6). If the mode setting unit 142 determines at step S54 that the operation mode is the shooting mode 164 or 167, the step goes to step S55, where the mode setting unit 142 sets the operation mode to the playback mode 165 or 168, and the process ends. That is, when the mode switching button 32 is operated in the case where the operation mode is the shooting mode 164 or 167, the mode setting unit 142 changes the operation mode from the shooting mode 164 or 167 to the playback mode 165 or 168 (transitions A9 and A18 in FIG. 6).

On the other hand, if the mode setting unit 142 determines at step S54 that the operation mode is not the shooting mode 164 or 167, that is, the operation mode is the playback mode 165 or 168, the step goes to step S56, where the mode setting unit 142 sets the operation mode to the shooting mode 164 or 167, and the process ends. That is, when the mode switching button 32 is operated in the case where the operation mode is the playback mode 165 or 168, the mode setting unit 142 changes the operation mode from the playback mode 165 or 168 to the shooting mode 164 or 167 (transitions A10 and A19 in FIG. 6).

Figure 13:
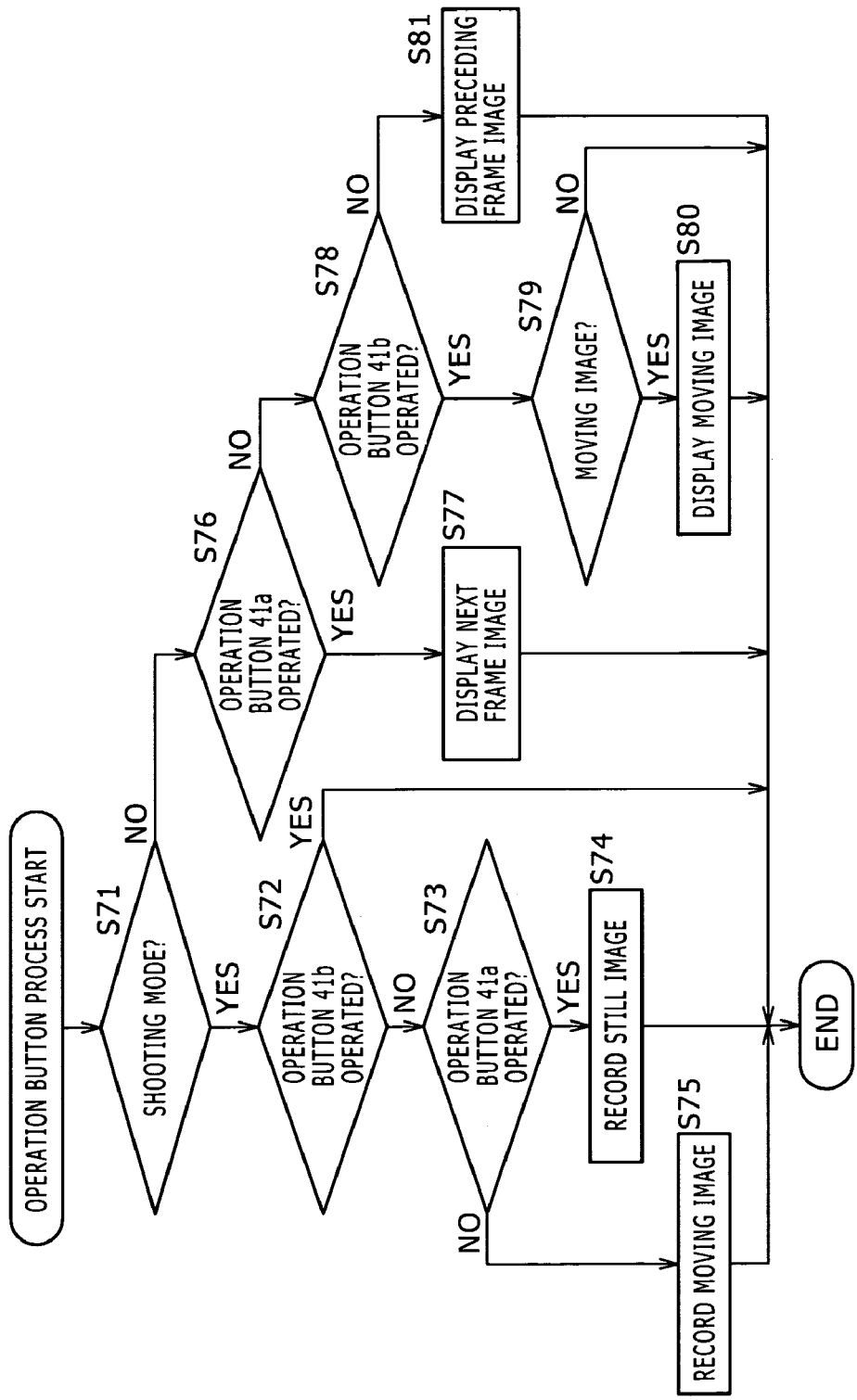
FIG. 13 is a flowchart explaining an operation button process in which the digital camera performs in accordance with an operation by a user of an operation button.

FIG. 13 is a flowchart explaining an operation button process in which the digital camera 1 performs in accordance with an operation by the user of the operation button 41*a*, 41*b* or 41*c*. The operation button process is initiated when, for example, an operation signal representing an operation of the operation button 41*a*, 41*b* or 41*c* from the external operation input unit 106 and a mode signal representing a set operation mode from the mode setting unit 142 are provided to the operation processor 143, in the case where the power is on.

At step S71, the operation processor 143 determines whether a mode signal from the mode setting unit 142 represents the shooting mode 162, 164, or 167 (FIG. 6), that is, the operation mode is the shooting mode 162, 164, or 167. If the operation processor 143 determines at step S71 that the operation mode is the shooting mode 162, 164, or 167, the operation processor 143 initiates shooting the subject, and the process goes to step S72. At step S72, the operation processor 143 determines whether an operation signal from the external operation input unit 106 represents the operation of the operation buttons 41*b*, that is, the operation button 41*b* has been operated.

If the operation processor 143 determines at step S72 that the operation button 41*b* has been operated, the process ends.

Further, if the operation processor 143 determines at step S72 that the operation button 41*b* has not been operated, the step goes to step S73, where the operation processor 143 determines whether the operation button 41*a* has been operated.

If the operation processor 143 determines at step S73 that the operation button 41*a* has been operated, the process goes to step S74, where the operation processor 143 records a still image of the subject as processing for dealing with the operation by the user.

More specifically, in the case where the operation mode is the shooting model 62, 164, or 167, the user operates the operation button 41*a* at a desired timing to give an instruction for shooting (recording) a still image while viewing the shot image displayed on the display panel 42. Further, when the user has operated the operation button 41*a*, the operation processor 143 records an image that is in the process of being shot into the storage unit 107 or the memory card 112 in units of flames as a still image, in accordance with an operation signal representing the operation of the operation button 41*a* from the external operation input unit 106.

On the other hand, if the operation processor 143 determines at step S73 that the operation button 41*a* has not been operated, that is, the operation button 41*c* has been operated, the process goes to step S75, where the operation processor 143 records a moving image of the subject as processing for dealing with the operation by the user.

More specifically, the user operates the operation button 41*c* at a desired timing to give an instruction for recording a moving image while viewing the image displayed on the display panel 42. The operation processor 143 records an image that is shot within a specified time period from the present time, that is, an image of a specified number of frames into the storage unit 107 or the memory card 112 as a moving image, in accordance with an operation signal representing the operation of the operation button 41*c* from the external operation input unit 106.

Further, in the case where the user operates the operation button 41*c*, the operation processor 143 may start recording the moving image when the user operates the operation button 41*c* and stop recording the moving image when the user operates the operation button 41*c* again, instead of recording the image that is shot within a specified time period as a moving image.

If the operation processor 143 determines at step S71 that the operation mode is not the shooting mode 162, 164, or 167, that is, the operation mode is the playback mode 165, 168, or 170 (FIG. 6), the operation processor 143 plays back a specified image from the storage unit 107 or the memory card 112 and displays it on the display panel 42, and the process goes to step S76. If the image to be played back is a still image, the operation processor 143 plays back the still image without being processed and displays it on the display panel 42. If the image to be played back is a moving image, the operation processor 143 plays back only the first frame of the moving image and displays it on the display panel 42.

At step S76, the operation processor 143 determines whether the operation button 41*a* has been operated. If the operation processor 143 determines at step S76 that the operation button 41*a* has been operated, the process goes to step S77. At step S77, the operation processor 143 performs processing for changing the playback image displayed on the display panel 42 to the next playback image (file forward), as processing for dealing with the operation by the user.

More specifically, in the case where the operation mode is the playback mode 165, 168, or 170, the user operates the operation button 41*a* when the user gives an instruction for file forward, that is, an instruction for displaying the next playback image on the display panel 42. Further, in accordance with an operation signal representing the operation of the operation button 41*a* from the external operation input unit 106, the operation processor 143 plays back the compressed image data of the frame next to the compressed image data corresponding to the current playback image displayed on the display panel 42 from the storage unit 107 or the memory card 112 and sends the image data to the DSP 86 for decompression. Further, the operation processor 143 controls the display controller 108 to display the playback image corresponding to the decompressed playback image data on the display panel 42.

If the operation processor 143 determines at step S76 that the operation button 41*a* has not been operated, the process goes to step S78, where the operation processor 143 determines whether the operation button 41*b* has been operated. If the operation processor 143 determines at step S78 that the operation button 41*b* has been operated, the process goes to step S79, where the operation processor 143 determines whether the current playback image displayed on the display panel 42 is a moving image (the first frame of a moving image).

If the operation processor 143 determines at step S79 that the current playback image displayed on the display panel 42 is a moving image, the process goes to step S80, where the operation processor 143 performs processing for playing back the moving image displayed on the display panel 42 in increasing order from the first frame of the moving image and displaying it on the display panel 42, as processing for dealing with the operation by the user.

More specifically, in the case where the operation mode is the playback mode 165, 168, or 170, the user operates the operation button 41b when the user gives an instruction for playing back the moving image from the beginning and displaying it on the display panel 42. Further, in accordance with an operation signal representing the operation of the operation button 41b from the external operation input unit 106, the operation processor 143 plays back the compressed image data corresponding to the current moving image displayed on the display panel 42 in increasing order from the first frame from the storage unit 107 or the memory card 112 and displays it on the display panel 42.

On the other hand, if the operation processor 143 determines at step S79 that the current playback image displayed on the display panel 42 is not a moving image, that is, the playback image is a still image, the process ends.

Further, if the operation processor 143 determines at step S78 that the operation button 41b has not been operated, that is, the operation button 41c has been operated, the process goes to step S81, where the operation processor 143 performs processing for changing the playback image displayed on the display panel 42 to the preceding playback image (file rewind), as processing for dealing with the operation by the user.

More specifically, in the case where the operation mode is the playback mode 165, 168, or 170, the user operates the operation button 41c when the user gives an instruction for file rewind, that is, an instruction for displaying the preceding playback image on the display panel 42. Further, in accordance with an operation signal representing the operation of the operation button 41c from the external operation input unit 106, the operation processor 143 plays back the compressed image data of the frame preceding to the compressed image data corresponding to the current playback image displayed on the display panel 42 from the storage unit 107 or the memory card 112. Further, the operation processor 143 controls the display controller 108 to display the playback image corresponding to the obtained playback image data on the display panel 42.

As described above, even if the user operates the same operation buttons 41a and 41c, the operation processor 143 changes the processing corresponding to the operation in accordance with the operation mode. In other words, a plurality of different functions are associated with the operation buttons 41a and 41c, thereby making it possible to reduce the number of operation buttons compared to the case where one function is associated with one operation button. As a result, it becomes possible to reduce a space for the operation buttons of the digital camera 1 to be placed, thereby making it possible to reduce the size of the digital camera 1.

Next, a description will be made as to the detection of the state a, b, c or d of the display panel unit 22 at the state detector 105 in FIG. 4, with reference to FIG. 14.

Figure 14:
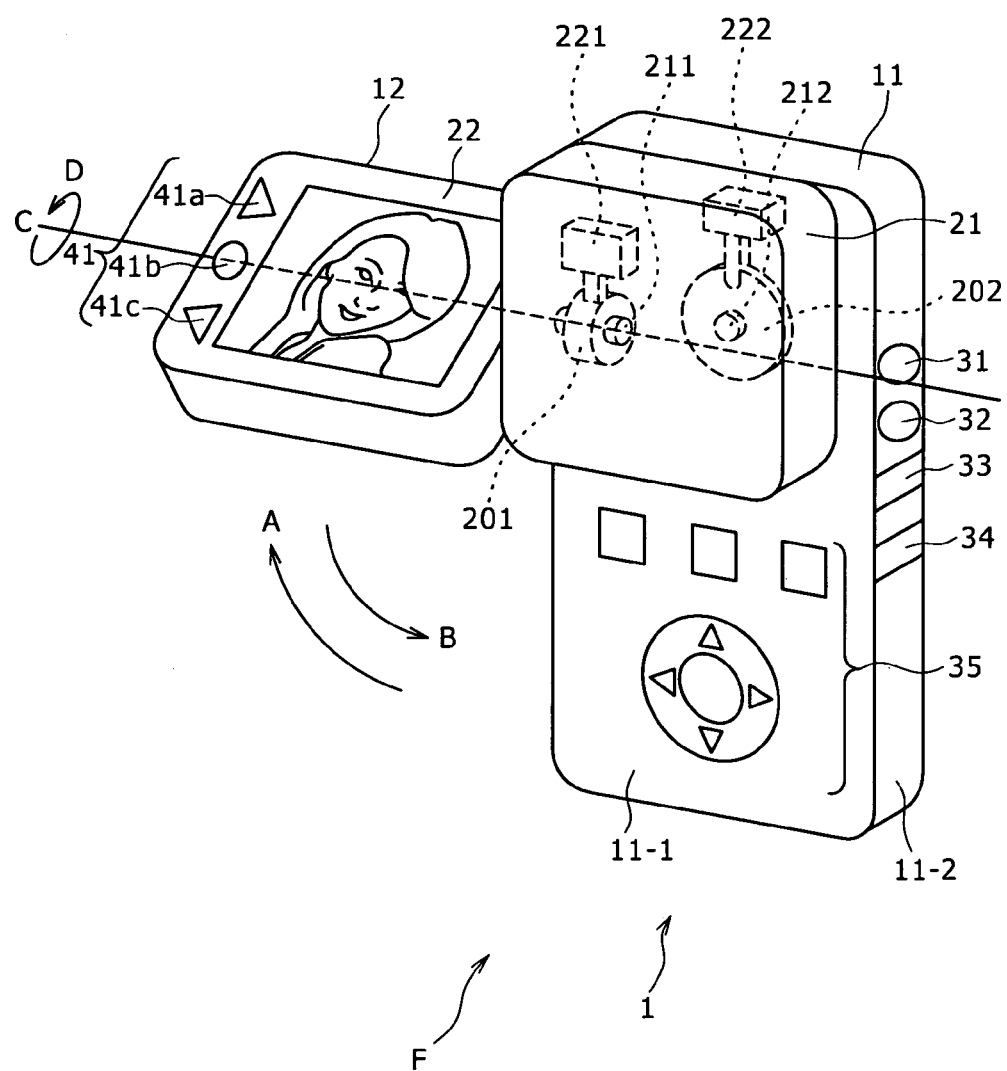
FIG. 14 is an illustration explaining the detection of a state a, b, c or d of a display panel unit at a state detector in FIG. 4.

FIG. 14 is a view in perspective of the attachment unit 21 of the digital camera 1.

There are provided cams 201 and 202 in the attachment unit 21. A shaft 211 is provided in the center of the cam 201. The center of the shaft 211 corresponds to axis C. The display panel unit 22 is supported such that it can rotate about the shaft 211 in the direction of arrow D. Further, a sensor 221 is connected to the cam 201. The sensor 221 detects a rotating state of the display panel unit 22 in accordance with, for example, a rotation angle of the shaft 211 of the cam 201. For example, assuming that the rotation angle of the shaft 211 is 0 degree when the display panel unit 22 is in the state a (FIG. 3A) or the state b (FIG. 3B), the sensor 221 detects the state c or d of the display panel unit 22 when the rotation angle of the shaft 211 is 180 degrees. That is, the sensor 221 detects that the display panel unit 22 is in the rotating state in which the display panel 42 can be viewed from the direction of arrow F.

A shaft 212 is provided in the center of the cam 202, as with the cam 201. The display panel unit 22 is supported such that it can open/close about the shaft 212 in the direction of arrow A or B with respect to the body unit 11. Further, a sensor 222 is connected to the cam 202, as with the cam 201. The sensor 222 detects an opening/closing state of the display panel unit 22 in accordance with, for example, a rotation angle of the shaft 212 of the cam 202. For example, assuming that the rotation angle of the shaft 212 is 0 degree when the display panel unit 22 is in the state a (FIG. 3A) or the state d (FIG. 3D), the sensor 222 detects the state b or c of the display panel unit 22 when the rotation angle of the shaft 212 is 90 degrees. That is, the sensor 222 detects that the display panel unit 22 is in the opening state.

The state detector 105 in FIG. 4 determines (detects) the state a, b, c or d of the display panel unit 22 based on a result detected by the sensors 221 and 222, and sends the state signal representing the state to the CPU 101.

For example, if the sensor 221 detects the state c or d and the sensor 222 detects the state b or c as the state of the display panel unit 22, the state detector 105 detects the state c detected by both of the sensors 221 and 222 as the state of the display panel unit 22 and sends the state signal representing the state to the CPU 101. That is, if the sensor 221 detects the state c or d, the display panel unit 22 is in the state in which the display panel 42 can be viewed from the direction of arrow F. If the sensor 222 detects the state b or c, the display panel unit 22 is in the opening state. In other words, the display panel unit 22 is in the state in which the display panel 42 can be viewed from the direction of arrow F and is in the state c of the opening state.

Further, the positions of the cams 201 and 202 are not limited to the positions shown in FIG. 14. That is, the positions of the cams 201 and 202 may be any positions as long as the display panel unit 22 can rotate about the shaft 211 of the cam 201 in the direction of arrow D and the display panel unit 22 can open/close about the shaft 212 of the cam 202 in the direction of arrow A or B with respect to the body unit 11.

Further, the transitions of the operation modes of the digital camera 1 are not limited to the transitions shown in FIGS. 6 to 9. For example, the user operates the operation buttons 35 or 41 to set a value representing an operation mode after transition or power-on or power-off in accordance with a state of the display panel unit 22 or an operation mode before transition, and based on the set value, an operation mode can be changed. In this case, based on a set value set by the user as well as a state signal or an operation signal, the power supply controller 141 controls power-on or power-off and the mode setting unit 142 sets an operation mode. More specifically, the power supply controller 141 controls the power supply 104 to turn the power on or off, which is represented by a set value corresponding to a state of the display panel unit 22 or an operation mode before transition. Further, the mode setting unit 142 sets an operation mode of the digital camera 1 after transition to an operation mode after transition represented by a set value corresponding to a state of the display panel unit 22 or an operation mode before transition.

Further, the functions associated with the operation buttons 41a to 41c are not limited to the functions shown in FIG. 13. For example, the user operates the operation buttons 35 or 41 to set a value representing a function (processing) corresponding to an operation of the operation button 41a, 41b or 41c, in accordance with each operation mode, and based on the set value, a function can be changed. In this case, based on a set value set by the user as well as a mode signal and an operation signal, the operation processor 143 changes processing corresponding to an operation of the operation button 41a, 41b or 41c represented by an operation signal. More specifically, the operation processor 143 changes processing corresponding to an operation of the operation button 41a, 41b or 41c represented by an operation signal to a function (processing) represented by a set value corresponding to the operation button 41a, 41b or 41c and an operation mode.

Further, as described above, there is no setting of the playback mode in the state a of the display panel unit 22. However, the display panel unit 22 may be set to the playback mode in the state a. In this case, since the display panel 42 is housed, the user cannot view a playback image displayed on the display panel 42 even if the operation mode is the playback mode.

Furthermore, as described above, there is no setting of the shooting mode in the state d of the display panel unit 22. However, the display panel unit 22 may be set to the shooting mode in the state d. In this case, an image displayed on the display panel 42 needs to be suited to an image to be shot in direction.

As described above, the state detector 105 detects the opening/closing or rotating state a, b, c or d of the display panel unit 22, and the digital camera sets an operation mode of the digital camera 1 at power-on in accordance with the detected state a, b, cord. In this manner, an operation mode at power-on can be set to an optimal operation mode.

Further, the present invention can be applied not only to the digital camera but also to a cellular phone, PDA (Personal Digital Assistance), and other information processing apparatuses.

In this specification, the steps describing a program for allowing a computer to execute a variety of processes are not necessarily processed in time series in the order described in a flowchart. The steps include the processes to be executed in parallel or individually (e.g., parallel processing or object-based processing).

Further, the program may be executed by a single computer, or by a plurality of computers with distributed processing. Furthermore, the program may be transferred to a remote computer and executed.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus, comprising:
a body;
a display unit configured to open/close and rotate with respect to the body;
a detector detecting at least one of an opening/closing state and a rotating state of the display unit; and
a mode setting unit setting an operation mode of the information processing apparatus to at least a shooting mode or a playback mode in accordance with a state of the display unit detected by the detector.

2. The information processing apparatus according to claim 1, wherein if the display unit is rotated such that a display surface of the display unit faces outward and is closed with respect to the body, then the mode setting unit sets the operation mode at power-on to the playback mode in which a playback image played back from a specified recording medium is displayed on the display unit.

3. The information processing apparatus according to claim 1, wherein based on a set value representing the operation mode that is set in accordance with each state of the display unit by a user, in accordance with a state of the display unit, the mode setting unit sets the operation mode at power-on to the operation mode represented by the set value corresponding to the state of the display unit.

4. The information processing apparatus according to claim 1, further comprising a power supply controller which controls power-on or power-off if the display unit is closed with respect to the body in accordance with the state of the display unit detected by the detector and the operation mode of the information processing apparatus.

5. The information processing apparatus according to claim 4, wherein if the power is on and the display unit is rotated such that the display surface of the display unit faces outward, and a state of opening the display unit with respect to the body has changed to a state of closing the display unit, the power supply controller performs control for keeping the power on if the operation mode is the playback mode in which a playback image played back from a specified recording medium is displayed on the display unit or for turning the power off if the operation mode is the shooting mode.

6. The information processing apparatus according to claim 4, wherein based on a set value representing power-on or power-off that is set in accordance with each state and each operation mode of the display unit by a user, in accordance with the state and the operation mode of the display unit, the power supply controller controls power-on or power-off represented by a set value corresponding to the state and the operation mode of the display unit in the case where the display unit is closed with respect to the body.

7. The information processing apparatus according to claim 1, further comprising:
an acceptance unit accepting an operation by a user; and
a processor performing processing corresponding to an operation accepted by the acceptance unit,
wherein the processor changes the processing corresponding to the operation, in accordance with the operation mode.

8. The information processing apparatus according to claim 7, wherein based on a set value representing processing corresponding to the operation that is set in accordance with each operation mode by a user, in accordance with the operation mode, the processor changes the processing corresponding to the operation to processing corresponding to an operation represented by a set value corresponding to the operation mode.

9. An information processing method of an information processing apparatus in which a display unit can open/close and rotate with respect to a body, the information processing method comprising the steps of:
detecting at least one of an opening/closing state and a rotating state of the display unit; and
setting an operation mode of the information processing apparatus to at least a shooting mode or a playback mode in accordance with a detected state of the display unit.

10. The information processing method according to claim 9, wherein if the display unit is rotated such that a display surface of the display unit faces outward and is closed with respect to the body, then the operation mode setting step sets the operation mode at power-on to the playback mode in which a playback image played back from a specified recording medium is displayed on the display unit.

11. The information processing method according to claim 9, wherein based on a set value representing the operation mode that is set in accordance with each state of the display unit by a user, in accordance with a state of the display unit, the operation mode setting step sets the operation mode at power-on to the operation mode represented by the set value corresponding to the state of the display unit.

12. The information processing method according to claim 9, further comprising controlling power-on or power-off if the display unit is closed with respect to the body in accordance with the state of the display unit detected by the detector and the operation mode of the information processing apparatus.

13. The information processing method according to claim 12, further comprising, if the power is on and the display unit is rotated such that the display surface of the display unit faces outward, and a state of opening the display unit with respect to the body has changed to a state of closing the display unit, keeping the power on if the operation mode is the playback mode in which a playback image played back from a specified recording medium is displayed on the display unit or turning the power off if the operation mode is the shooting mode.

14. The information processing method according to claim 12, wherein based on a set value representing power-on or power-off that is set in accordance with each state and each operation mode of the display unit by a user, in accordance with the state and the operation mode of the display unit, power-on or power-off is controlled represented by a set value corresponding to the state and the operation mode of the display unit if the display unit is closed with respect to the body.

15. The information processing method according to claim 9, further comprising:

accepting an operation by a user; and performing processing corresponding to an operation accepted by the acceptance unit and the operation mode.

16. The information processing method according to claim 15, wherein based on a set value representing processing corresponding to the operation that is set in accordance with each operation mode by a user, in accordance with the operation mode, the processing changes corresponding to the operation to processing corresponding to an operation represented by a set value corresponding to the operation mode.

17. A computer-readable storage medium storing a computer program that causes a processor in an information processing apparatus to execute a method, the method comprising:

detecting at least one of an opening/closing state and a rotating state of a display unit of the information processing apparatus; and setting an operation mode of the information processing apparatus to at least a shooting mode or a playback mode in accordance with a detected state of the display unit.

* * * * *